(12) United States Patent
Skaf

(10) Patent No.: US 11,210,694 B2
(45) Date of Patent: Dec. 28, 2021

(54) SYSTEM AND METHOD FOR TRACKING AND REWARDING USERS AND PROVIDING TARGETED ADVERTISING

(71) Applicant: Mazen A. Skaf, San Carlos, CA (US)

(72) Inventor: Mazen A. Skaf, San Carlos, CA (US)

( * ) Notice: Subject to any disclaimer, the term of this patent is extended or adjusted under 35 U.S.C. 154(b) by 294 days.

(21) Appl. No.: 15/922,410

(22) Filed: Mar. 15, 2018

(65) Prior Publication Data

US 2018/0276703 A1    Sep. 27, 2018

Related U.S. Application Data

(63) Continuation of application No. 14/339,261, filed on Jul. 23, 2014, now Pat. No. 9,953,337, which is a continuation of application No. 11/970,376, filed on Jan. 7, 2008, now Pat. No. 8,812,532.

(60) Provisional application No. 60/883,971, filed on Jan. 8, 2007.

(51) Int. Cl.
*G06Q 30/02* (2012.01)
*G06F 16/954* (2019.01)
*G06F 16/9535* (2019.01)

(52) U.S. Cl.
CPC ....... *G06Q 30/0231* (2013.01); *G06F 16/954* (2019.01); *G06F 16/9535* (2019.01); *G06Q 30/02* (2013.01)

(58) Field of Classification Search
CPC .. G06F 16/9535; G06F 16/957; G06F 16/954; G06Q 30/0231; G06Q 30/02
See application file for complete search history.

(56) References Cited

U.S. PATENT DOCUMENTS

| 5,794,210 | A  | 8/1998  | Goldhaber et al. |
| 6,251,017 | B1 | 6/2001  | Leason et al. |
| 6,405,175 | B1 | 6/2002  | Ng |
| 7,072,886 | B2 | 7/2006  | Salmenkaita et al. |
| 7,269,853 | B1 | 9/2007  | Dunn |
| 7,590,705 | B2 | 9/2009  | Mathew |
| 7,774,704 | B2 | 8/2010  | Koba |
| 7,827,059 | B2 | 11/2010 | Arning |

(Continued)

FOREIGN PATENT DOCUMENTS

WO    2008086299 A2    7/2008

OTHER PUBLICATIONS

"Amazon.com:Help>Payment, Pricing & Promotions>A9 Instant Reward", http://www.amazon.com/gp/help/customer/display.html?ie=UTF8&nodeId=13686391, printed from the World Wide Web on Dec. 17, 2007, 5 pages.

(Continued)

*Primary Examiner* — Apu M Mofiz
*Assistant Examiner* — Sheryl L Holland
(74) *Attorney, Agent, or Firm* — KPPB LLP

(57) ABSTRACT

Systems and methods of tracking and rewarding users of any of a variety of content hosting systems, such as search engines. In one embodiment, a method of rewarding a user of a search engine includes receiving secure identification information identifying a user, retrieving user account information using the secure identification information, receiving a search query associated with the user account information, crediting the user account with a reward that is directly related to providing the search query, and returning search results in response to the received search query.

20 Claims, 17 Drawing Sheets

(56) References Cited

U.S. PATENT DOCUMENTS

| | | | |
|---|---|---|---|
| 7,882,032 | B1 | 2/2011 | Hoffman et al. |
| 8,535,158 | B2 | 9/2013 | Kelly et al. |
| 8,812,532 | B2 | 8/2014 | Skaf |
| 8,950,669 | B1 | 2/2015 | Buchheit et al. |
| 9,953,337 | B2 | 4/2018 | Skaf |
| 2001/0049620 | A1 | 12/2001 | Blasko |
| 2002/0046091 | A1 | 4/2002 | Mooers et al. |
| 2002/0065723 | A1 | 5/2002 | Anderson et al. |
| 2002/0099605 | A1* | 7/2002 | Weitzman ............. G06Q 30/02 705/14.35 |
| 2003/0120542 | A1 | 6/2003 | Arning |
| 2003/0233278 | A1 | 12/2003 | Marshall |
| 2004/0139107 | A1 | 7/2004 | Bachman et al. |
| 2004/0193611 | A1 | 9/2004 | Raghunandhan |
| 2004/0239480 | A1 | 12/2004 | Beenau et al. |
| 2004/0260680 | A1 | 12/2004 | Best et al. |
| 2005/0021399 | A1 | 1/2005 | Postrel et al. |
| 2005/0096975 | A1 | 5/2005 | Moshe |
| 2005/0132060 | A1 | 6/2005 | Mo et al. |
| 2005/0192863 | A1* | 9/2005 | Mohan ............. G06Q 30/0277 705/14.19 |
| 2005/0193093 | A1* | 9/2005 | Mathew ............... G06Q 30/02 709/219 |
| 2005/0240472 | A1* | 10/2005 | Postrel ................ G06Q 20/06 705/14.23 |
| 2005/0273387 | A1 | 12/2005 | Previdi |
| 2006/0027647 | A1 | 2/2006 | Deane et al. |
| 2006/0111189 | A1 | 2/2006 | Winkler |
| 2006/0155764 | A1 | 7/2006 | Tao |
| 2006/0161534 | A1 | 7/2006 | Carson et al. |
| 2006/0206460 | A1 | 9/2006 | Gadkari |
| 2006/0224496 | A1 | 10/2006 | Sandholm et al. |
| 2006/0253320 | A1* | 11/2006 | Heywood ............. G06Q 30/02 705/14.18 |
| 2006/0265283 | A1 | 11/2006 | Gorodyansky |
| 2007/0032229 | A1 | 2/2007 | Jones |
| 2007/0033171 | A1 | 2/2007 | Trowbridge |
| 2007/0038511 | A1 | 2/2007 | Hytken |
| 2007/0043583 | A1 | 2/2007 | Davulcu et al. |
| 2007/0055871 | A1 | 3/2007 | Ghanea-Hercock et al. |
| 2007/0061245 | A1 | 3/2007 | Ramer |
| 2007/0067297 | A1 | 3/2007 | Kublickis |
| 2007/0078718 | A1 | 4/2007 | Gorodyansky |
| 2007/0112622 | A1 | 5/2007 | Meggs |
| 2007/0129955 | A1 | 6/2007 | Dalmia et al. |
| 2007/0143281 | A1* | 6/2007 | Smirin ................ G06F 16/9535 |
| 2007/0179933 | A1 | 8/2007 | Lee et al. |
| 2007/0192369 | A1 | 8/2007 | Gross |
| 2007/0198354 | A1 | 8/2007 | Senghore et al. |
| 2007/0203738 | A1 | 8/2007 | Jaschke |
| 2007/0239560 | A1 | 10/2007 | McGuire et al. |
| 2007/0259709 | A1 | 11/2007 | Kelly et al. |
| 2007/0271247 | A1 | 11/2007 | Best et al. |
| 2007/0288312 | A1 | 12/2007 | Wang et al. |
| 2008/0004951 | A1* | 1/2008 | Huang ................. G06Q 30/02 705/14.67 |
| 2008/0021721 | A1 | 1/2008 | Jones et al. |
| 2008/0071613 | A1 | 3/2008 | Eppert |
| 2008/0103971 | A1 | 5/2008 | Lukose et al. |
| 2008/0104521 | A1* | 5/2008 | Dubinko ............. G06F 3/0484 715/744 |
| 2008/0168099 | A1 | 7/2008 | Skaf et al. |
| 2008/0201199 | A1 | 8/2008 | Armstrong et al. |
| 2009/0265233 | A1 | 10/2009 | Sendo et al. |
| 2010/0280906 | A1 | 11/2010 | Lim et al. |
| 2012/0253886 | A1 | 10/2012 | Nelson et al. |
| 2012/0284109 | A1 | 11/2012 | Postrel et al. |
| 2014/0337115 | A1 | 11/2014 | Skaf |

OTHER PUBLICATIONS

Blingo, http://www.blingo.com/, printed from the World Wide Web on Dec. 17, 2007, 1 page.
CapaZoo Has Lots of Ways to Make Money Off You, http://mashable.com/2007/10/23/capazoo/, printed from the World Wide Web on Dec. 17, 2007, 5 pages.
CapaZoo Has Lots of Ways to Make Money Off You, http://mashable.com/200710/23/capazoo/, printed from the World Wide Web on Dec. 17, 2007, 6 pages.
Capazoo Launches New Social Life Networking and Entertainment Website That Transce . . . , http://biz.yahoo.com/prnews/071022/nym015.html?.v= 101 %20, printed from the World Wide Web on Dec. 17, 2007, 3 pages.
Contest, Talent Contest, Poll, Voting Software, Bikini Contest, Free Contest, Photo Conte . . . , http://www.sizzlefizzle.com/, printed from the World Wide Web on Dec. 17, 2007, 3 pages.
http://www.megaglobeforums.com/screenshots/searchawards.PNG, printed from the World Wide Web on Dec. 17, 2007, 1 page.
International Preliminary Report on Patentability for International Application No. PCT/US2008/050421, Report dated Jul. 14, 2009, 6 pgs.
International Search Report and Written Opinion for International Application PCT/US2008/050421; report completed Aug. 21, 2008; 7 pgs.
IWon-, http://www1.iwon.com/home/winning/howitworks_overview/0,11933,,00.html, printed from the World Wide Web on Dec. 17, 2007, 5 pages.
Jellyfish, http://www.jellyfish.com/howToUseJellyfish, printed from the World Wide Web on Dec. 17, 2007, 3 pages.
Live Search: Search & Win with a new UI, http://blogs.msdn.com/livesearch/archive/2006/02/16/533544.aspx, printed from the World Wide Web on Dec. 17, 2007, 9 pages.
Megaglobe Screenshots Released!—Megaglobe Forums, http://www.megaglobeforums.com/showthread.php?t=196, printed from the World Wide Web on Dec. 17, 2007, 4 pages.
Mills, "Yahoo to offer incentives for using search engine? / Tech news blog—CNET News.com", http://www.news.com/8301-10784_3-6037090-7.html, printed from the World Wide Web on Dec. 17, 2007, 3 pages.
Personalization, Personalization Gift, Personalization Software, Search Engine, http://www.irazoo.com/aboutus.aspx, printed from the World Wide Web on Dec. 17, 2007, 3 pages.
"Do Not Track", Electronic Frontier Foundation, www.eff.org, Feb. 26, 2014.
"Social Networking Sites Grow 47 Percent, Year over Year, Reaching 45 Percent of Web Users, According to Nielsen/NetRatings", Nielsen NetRatings, Inc, May 11, 2006, 3 pgs.
"Tracking Preference Expression (DNT)", W3C Working Draft, Jan. 28, 2014, W3C.
David, T., "Incentives Won't Make Yahoo of MSN #1 Search", www.makeyougohmmm.com, Feb. 9, 2006, 3 pgs.
Eckersley et al., "Six Tips to Protect Your Search Privacy", Electronic Frontier Foundation, Sep. 14, 2006.
Kleinberg et al., "Query Inventive Networks", Proceedings of the 2005 46th Annual IEEE Symposium on Foundation of Computer Science, 2005.
Mangalindan, "Web Start-Up to Share Revenue from Advertisers With Shoppers", http://web.archive.org/web/20070506044241/online.wsj.com/article/SB115128498276499 . . . , printed from the World Wide Web on Dec. 17, 2007, 1 page.
Mills, "Rewards program boosts Microsoft search share", http://www.news.com/8301-10784_3-9745369-7.html, printed from the World Wide Web on Dec. 17, 2007, 3 pages.
Murdoch et al., "Low-Cost Traffic Analysis of TOR", 2005 IEEE Symposium on Security and Privacy, May 11, 2005.
Shavlik, "Estimating User's Interest in Web Pages by Unobtrusively Monitoring User's Normal Behavior", American Association for Artificial Intelligence, 2000.
Vascellaro, "Search Engines Start Rewards Programs", http://online.wsj.com/public/article/SB114066358277980943.html?mod=todays_free_fea . . . ,printed from the World Wide Web on Dec. 17, 2007, 3 pages.
LexisNexis Rewards, The Online Legal Research Tool, 2009, 2 pgs.

\* cited by examiner

Select and Approve Data Tracking and Usage

Enable Toggle Switch Functionality for System Tracking: ● Yes ○ No

When System Tracking is ON, allow usage of: (select all that apply)

☒ Search Data
☒ Browsing Data
(Please select at least one of the above)

☒ Personal Profile Data
☐ Relationships and Lifestyle Data
☐ Data from Other Linked Accounts

[ Advanced ]
(To Specify Usage by Data Field)

98

Toggle Switch for System Tracking
- Turn On/Off System Tracking and Usage of User Search and Browsing Data

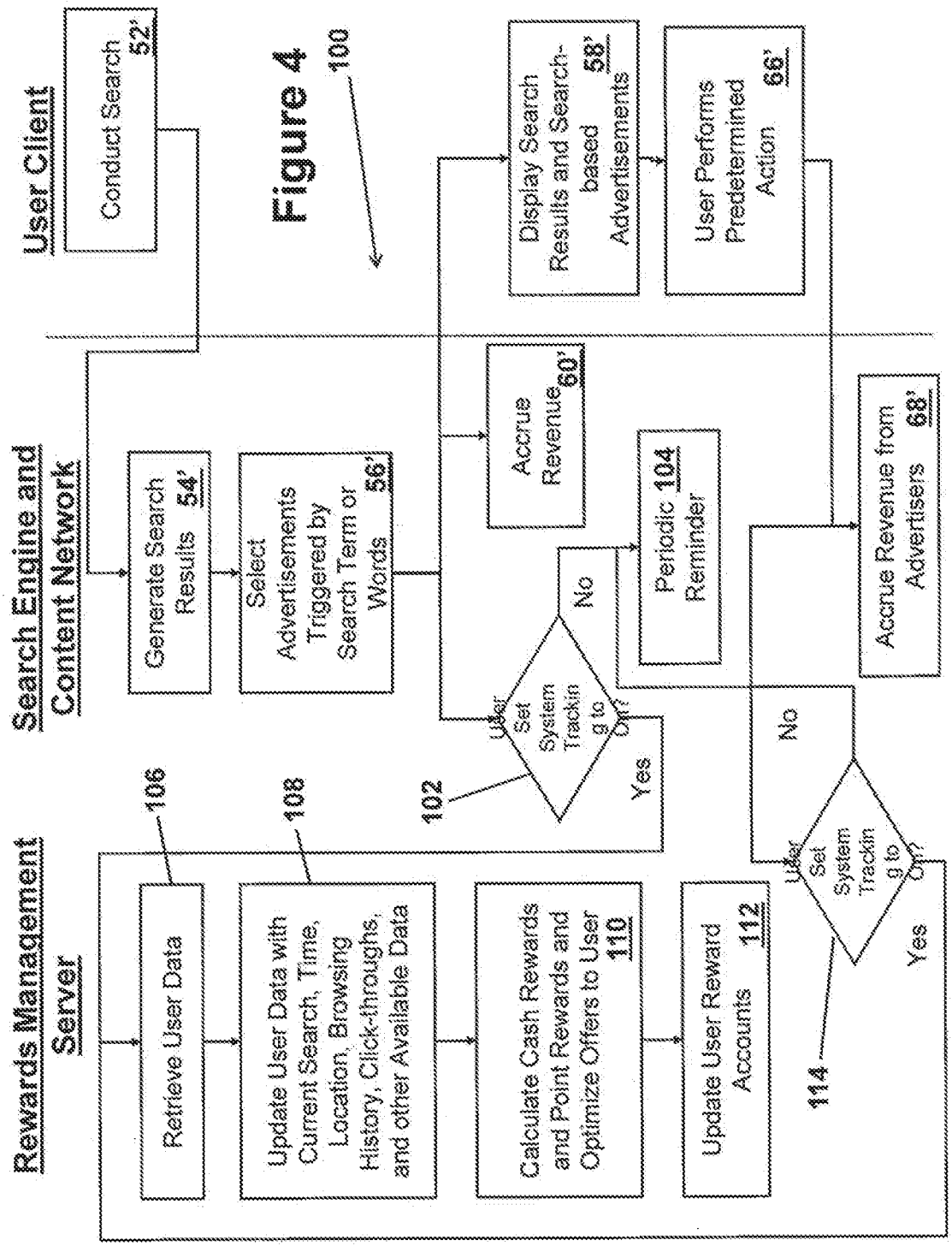

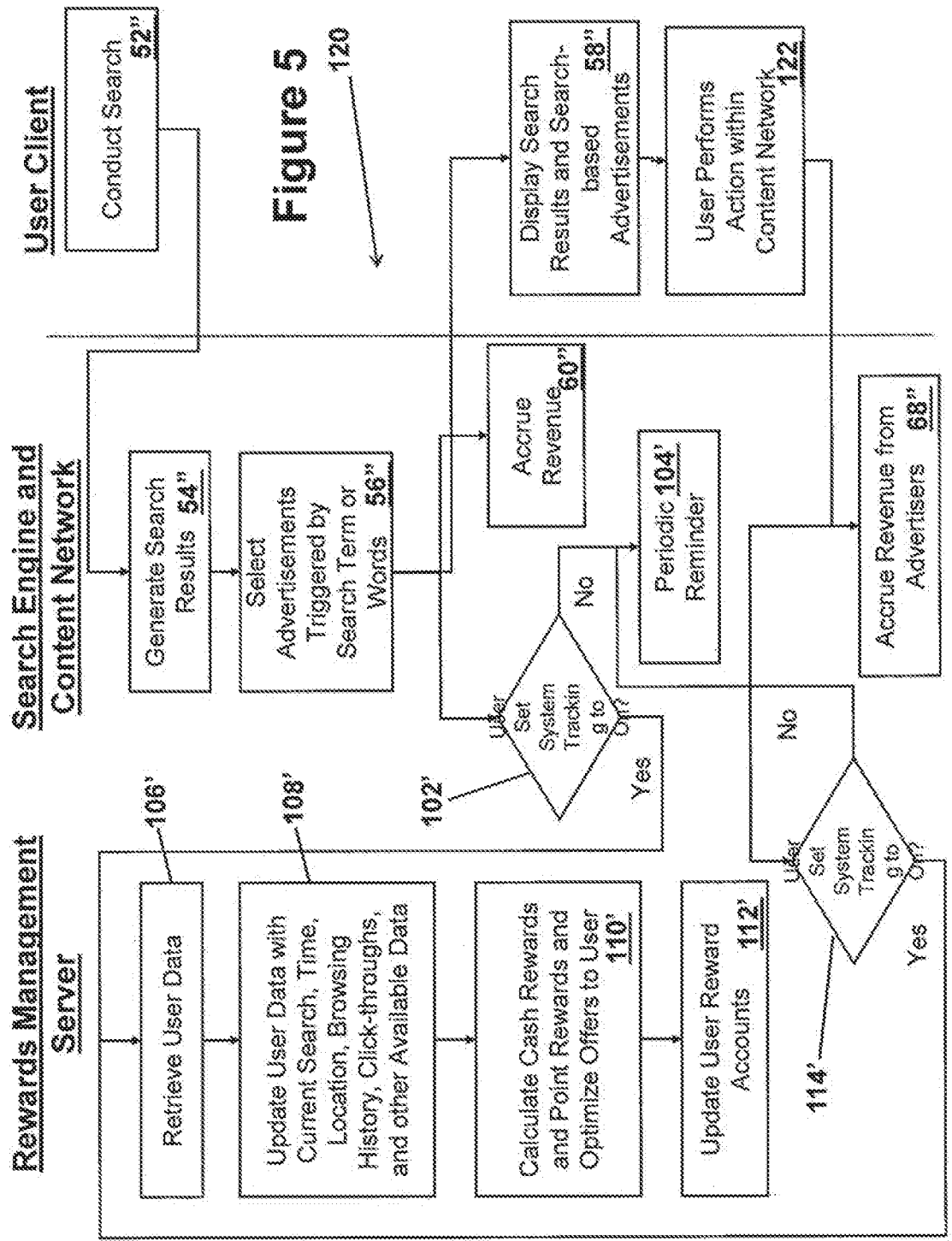

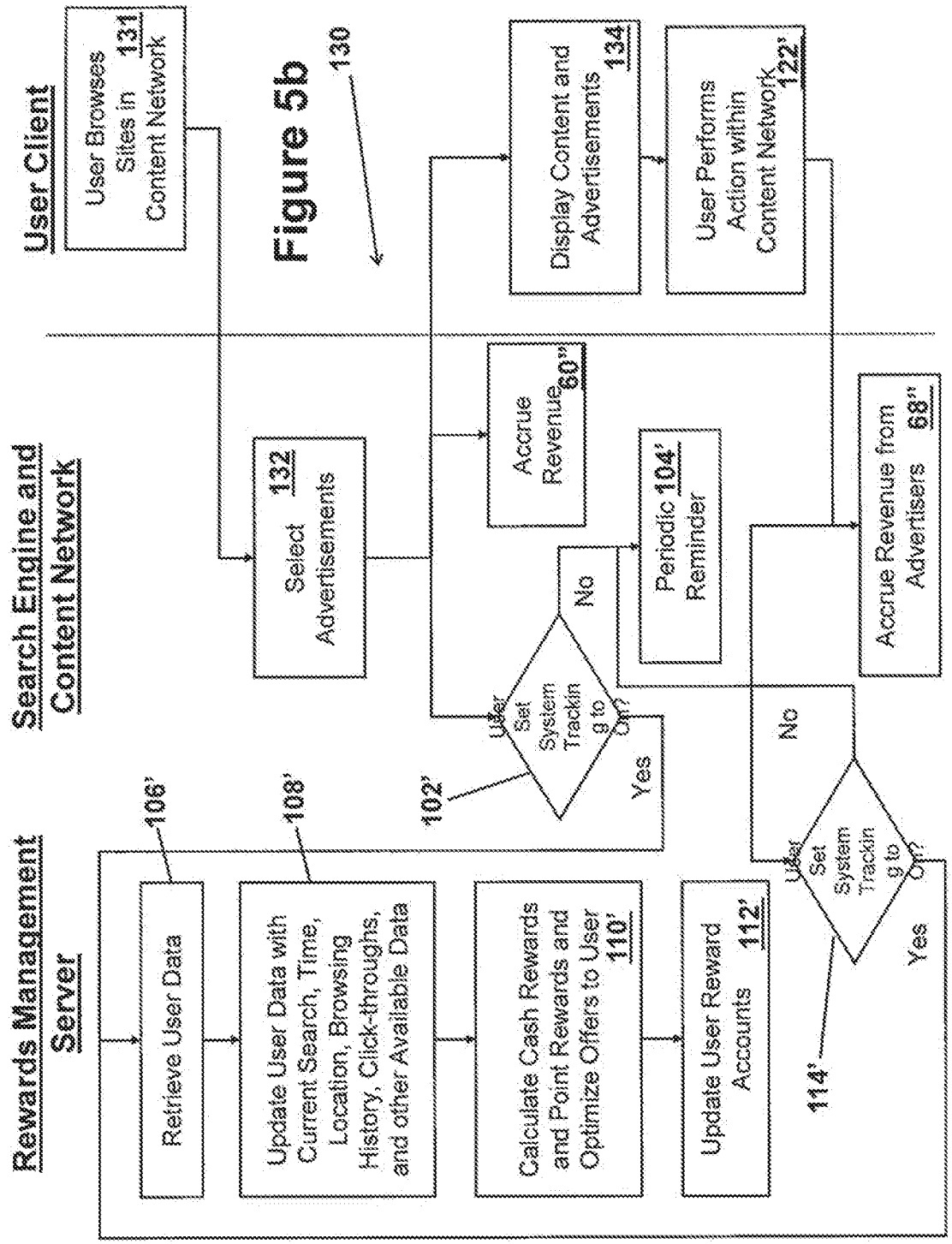

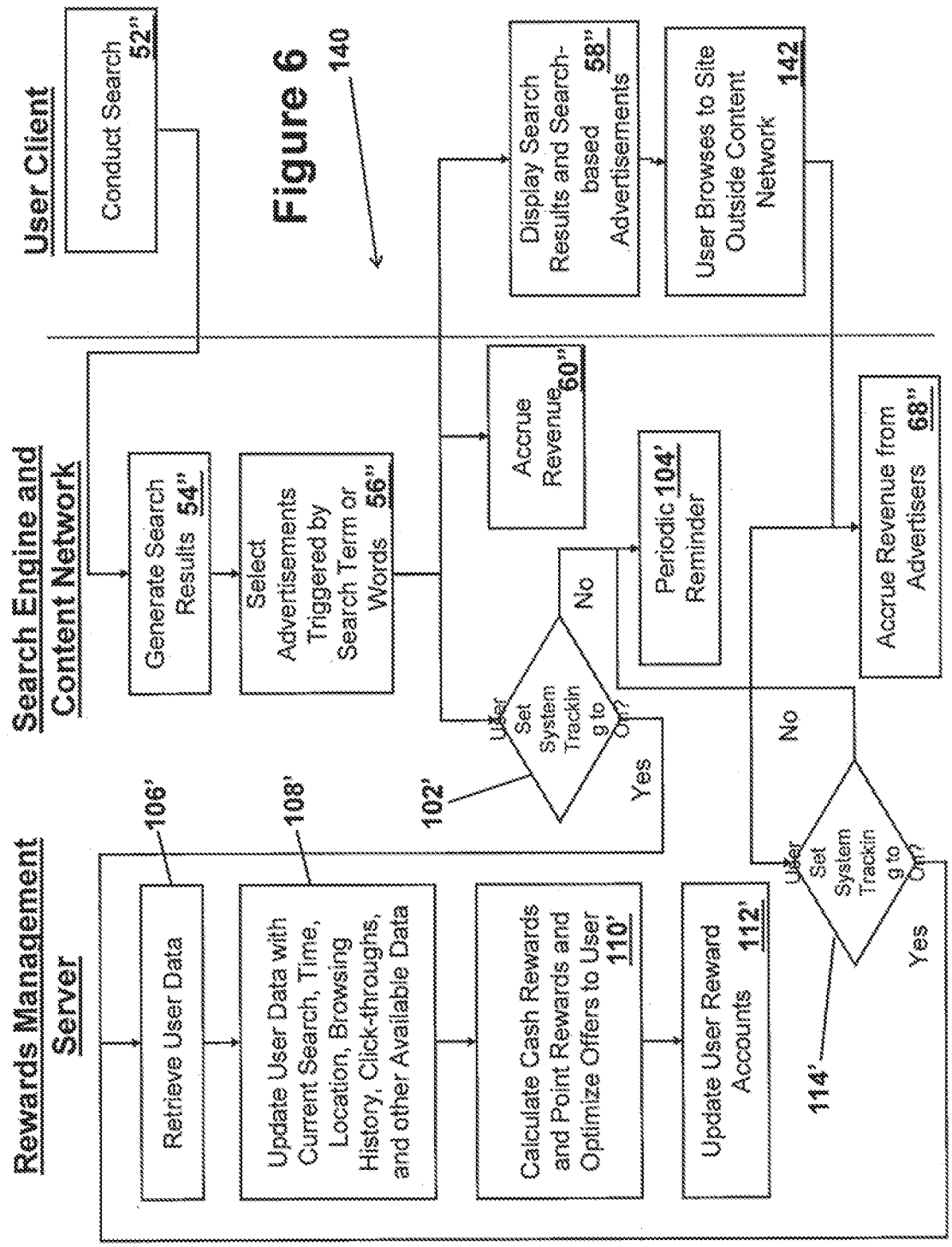

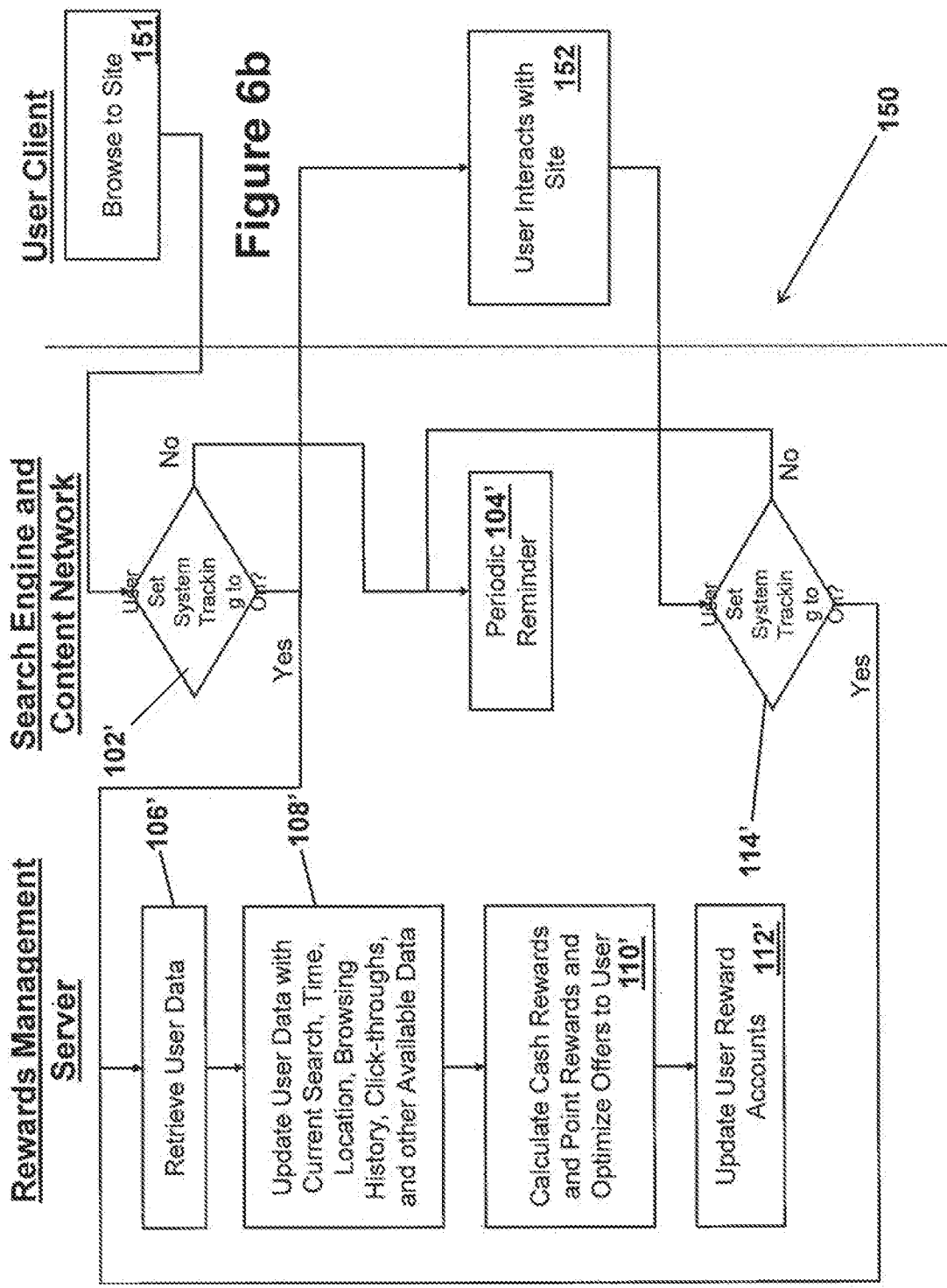

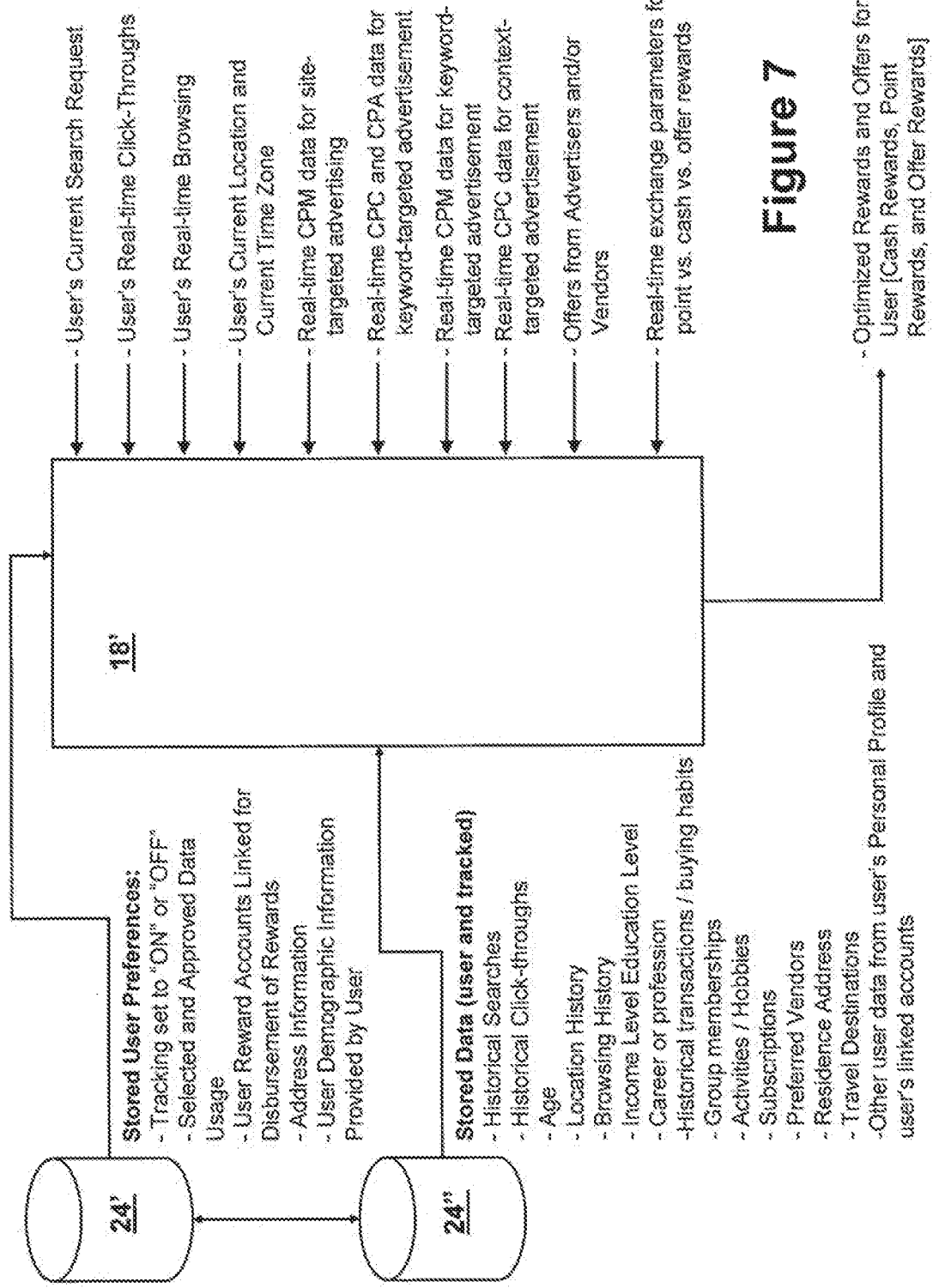

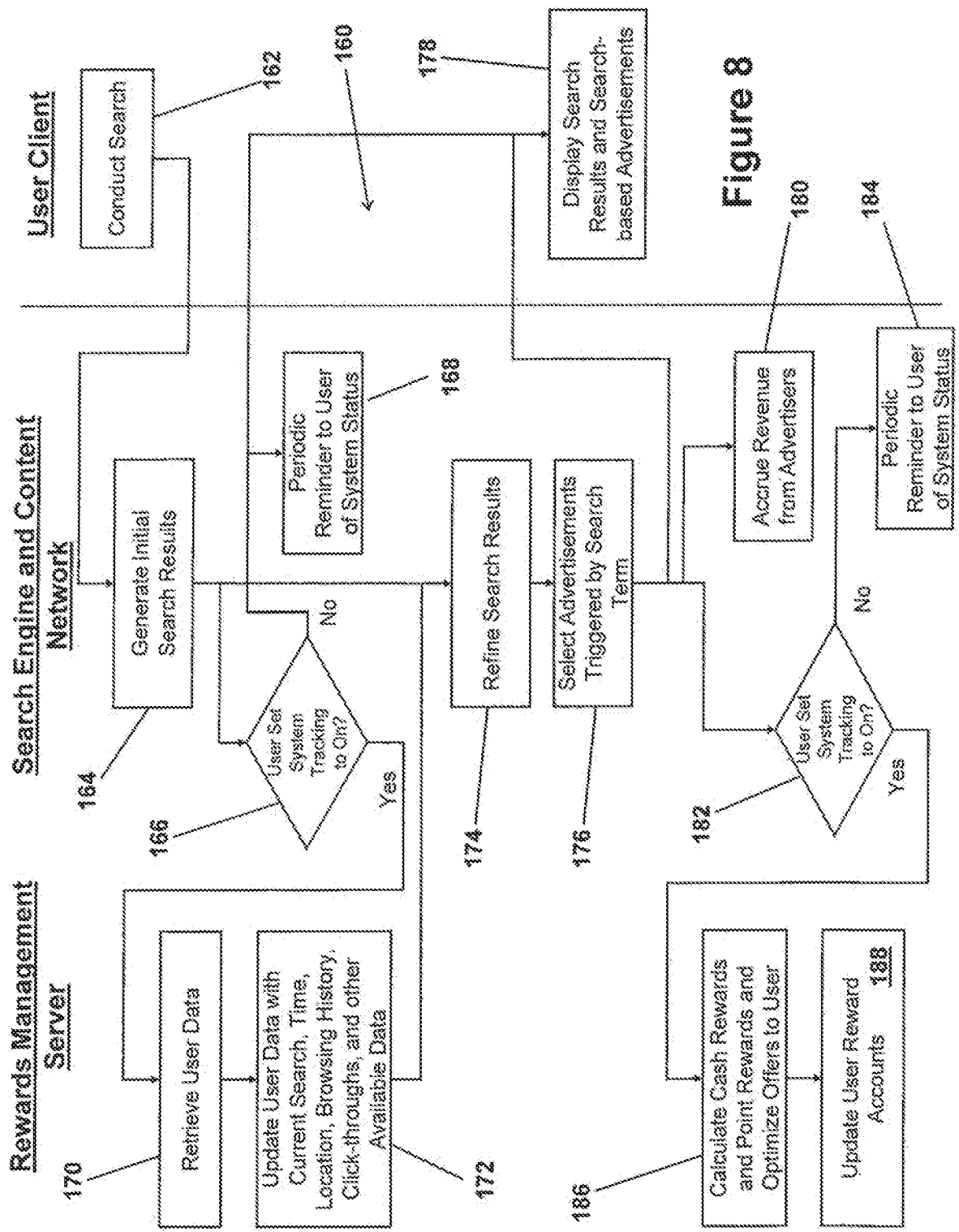

SYSTEM AND METHOD FOR TRACKING AND REWARDING USERS AND PROVIDING TARGETED ADVERTISING

CROSS-REFERENCE TO RELATED APPLICATIONS

The current application claims priority to U.S. patent application Ser. No. 14/339,261, filed Jul. 23, 2014, which claims priority to U.S. patent application Ser. No. 11/970,376, filed Jan. 7, 2008 and issued as U.S. Pat. No. 8,812,532 on Aug. 19, 2014, which claims priority to U.S. Provisional Patent Application No. 60/883,971, filed Jan. 8, 2007, the disclosures of which are incorporated herein by reference.

BACKGROUND

The present invention relates generally to rewards programs and more specifically to the tracking of users and the rewarding of users based upon tracked behavior.

Many internet search engines generate revenue by selling advertising space to advertisers that wish to provide advertising relevant to specific key word search terms or that wish to target specific keywords on a broad content network or target specific sites or target a specific audience. In many instances, competition for advertising space is resolved by the search engine operator auctioning key word advertising or site-targeted advertising or context-targeted advertising to the highest bidder. The amount of revenue generated by a search engine is typically proportional to the number of impressions (i.e., number of people to whom the advertising was shown) and/or the number of click-throughs (i.e., the number of people that visited the advertiser's web page in response to the advertisement) and/or the number of people who take a specific action (such as complete a form or initiate a call or sign-up for a service or execute a transaction or buy some good or service) and/or the total value of transactions conducted by users as a result of the advertisement or promotion or offer from the search engine or its content network partners or advertising partners or advertisers or combinations thereof.

Content providers can attempt to increase advertising revenue by providing advertising relevant to the content provided. In many instances, the advertising is provided by third parties that use tools to determine the nature of the content offered by a content provider and match the advertising to the content.

Mobile devices are increasingly being used to view content. Therefore, mobile devices are also becoming devices that can be used to distribute advertising. The increasing functionality of mobile devices is also leading a number of mobile network operators to contemplate providing transaction services in addition to voice and data services. Transaction services can include enabling users to subscribe to services offered by the mobile network operator, subscribing to services offered by third parties, purchasing goods, making payments via financial accounts or other payment technique, and/or other types of transactions.

SUMMARY OF THE INVENTION

Systems for tracking and rewarding user behavior are described. One embodiment includes receiving secure identification information from the user, retrieving user account information using the secure identification information, receiving a search query from the user, crediting the user account with a reward that is directly related to providing the search query, and returning search results.

A further embodiment includes establishing a content network including a plurality of separate content sources, receiving secure identification information from a user client application, retrieving user account information using the secure identification information, and crediting the user account with a reward that is related to a user interaction with a content source within the content network.

Another embodiment includes a computing device connected to a network, content servers connected to the network and a tracking server connected to the network. In addition, the computing device is configured to view content provided by the content servers via the network and the computing device is configured to provide identification information and information concerning user activities to the tracking server via the network in response to a user authorization.

A yet further embodiment includes a mobile communication device configured to receive content from a content server via a mobile network provided by a network operator and a rewards server that is configured to track interactions between the mobile communication device and content servers. In addition, the rewards server is configured to credit an account associated with the user in response to specific actions of the mobile communication device.

BRIEF DESCRIPTION OF THE DRAWINGS

FIG. 4 is a flow chart of a process for allocating rewards to a user of a search engine provided the user has elected to have the user's actions tracked in accordance with an embodiment of the present invention.

FIGS. 5 and 5b are flow charts showing processes similar to the process shown in FIG. 4 where information and data collected from the user's browsing to websites within a predetermined content network is used to optimize the allocation of rewards and offers to the user.

FIGS. 6 and 6b are flow charts showing processes similar to the processes shown in FIGS. 4 and 5 where information and data collected from the user's browsing to websites that are not within a predetermined content network is used to optimize the allocation of rewards and offers to the user.

FIG. 7 is a schematic diagram of a rewards management server connected to external storage devices in accordance with an embodiment of the invention.

FIG. 8 is a flow chart showing a process for refining search results using historical information collected about a user in accordance with an embodiment of the invention.

DETAILED DESCRIPTION OF THE INVENTION

Turning now to the drawings, systems for tracking and rewarding user behavior are shown. In several embodiments, the system is capable of tracking activities of a user including sites visited by the user and interactions that a user has with the site. In many embodiments, tracked information is used to allocate rewards to the user. Typically, the rewards are awarded in direct response to the user performing a specified activity. Direct rewards can be distinguished from random awards, which typically involve a user being allocated an entry in a sweepstake in response to the completion of a predetermined activity. Allocation of rewards can vary depending upon the system. The rewards can be associated with use of a search engine, activities within a content network and/or activities associated with use of a mobile device, such as a cell phone, personal digital assistant, and/or other networked consumer electronics device. The rewards can take any of a variety of forms including: money; points redeemable for money, goods and/or services; goods; discounts on goods (including coupons) and/or services, including free mobile phone minutes.

In a number of embodiments, a user creates a profile that is stored in a rewards management system. The profile can be populated from a variety of sources including from the user directly, from profiles associated with other accounts and/or from information collected by the system as the system tracks the user's activity. Tracked information and/or rewards are associated with the user's profile and actual or inferred information from the profile can be used in the selection of rewards, in the selection of offers and in the provision of services.

In several embodiments, the user has complete control over when the user's activities are tracked by the system and the types of information collected when the user's activities are being tracked. In many embodiments, the tracked information is used to improve the quality of services provided to the user, such as search services. In a number of embodiments, the tracked information and/or a user's profile are used to refine the rewards allocated to a user. In several embodiments, tracked information from one or more users is used to detect attempts to game the system and to penalize attempts to fraudulently obtain rewards. Systems for tracking and rewarding users in accordance with embodiments of the invention are discussed further below.

Tracking and Rewards System

Figure 1:
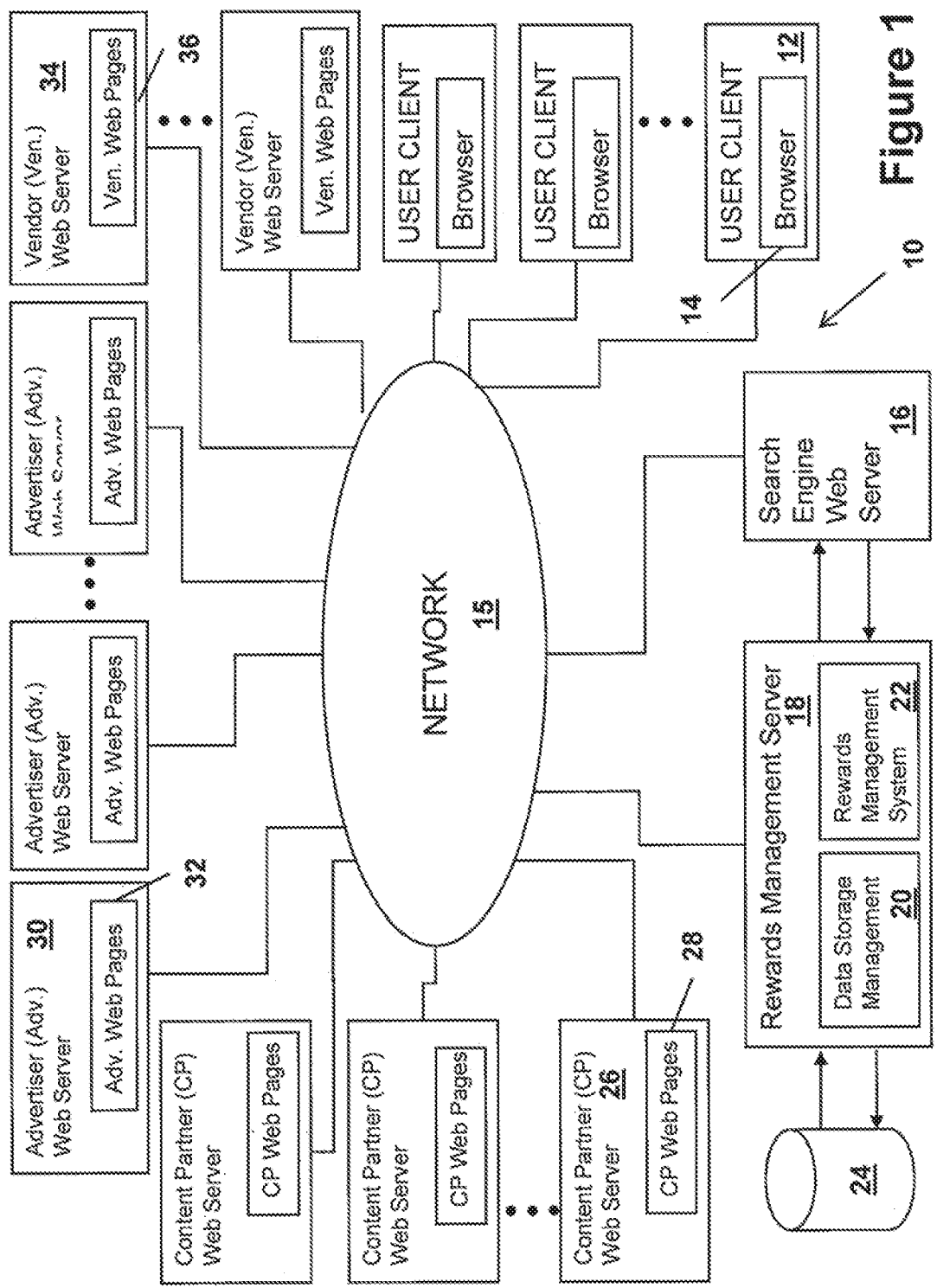
FIG. 1 is a schematic diagram of a tracking and rewards system in accordance with an embodiment of the invention.

A system for tracking user behavior and rewarding users in accordance with an embodiment of the invention is shown in FIG. 1. The system 10 includes at least one client 12 that is capable of obtaining information from online content sources via a network 15. In a number of embodiments, a client is an appropriately configured personal computer. In many embodiments, a client is a consumer electronics device such as a mobile phone, a portable game machine, set top box and/or any other device capable of connecting to a data network. In the illustrated embodiment, the client is connected to a network 15. The network can be the Internet, a cable network or mobile phone network, a wireless access point or any other communication network.

The system 10 includes a search engine server 16 and a rewards management server 18. The search engine server 16 and the rewards management server 18 are both connected to the network and in many embodiments are connected to each other. The rewards management server 18 includes a data storage management system 20 and a rewards management system 22. The rewards management server 18 is also connected to a storage device 24.

A number of web servers are also connected to the network 15 and many of the servers are associated with content networks. A content network is an association of content sources that can include online sources that provide content via a digital communication network on an on demand basis (such as the web servers 26 shown in FIG. 1) and offline sources such as television content providers (including broadcast, cable and satellite), print media and other sources that provide content on a basis other than an on demand basis. The association formed between the content sources can take any of a variety of forms. In a number of embodiments, content networks include a number of content sources that source advertising and/or other services from a single source. In other embodiments, content networks include a number of content sources that collectively market or sell advertising. In many embodiments, a content network is created by a number of content sources seeking to jointly promote content and/or services from the various sources within the content network. In the illustrated embodiment, the content network web servers 26 host web pages 28 that provide content and can include additional features associated with membership in the content network. The additional features may simply be information indicating membership of the content network. The additional features could also include providing access to a search engine that forms part of the content network or that has agreed to provide search services to a content network, advertising provided by an advertising source associated with the content network and any other feature that advances the interests of the content network.

In a number of embodiments, a number of web pages within the content network include search functionality enabled by the search engine web server 16 and/or include search-based advertising. In many embodiments, the advertising is site-targeted advertising, contextual advertising context-targeted advertising, content-targeted advertising, keyword-targeted advertising, and/or other forms of advertising.

Several of the web servers illustrated in FIG. 1 are associated with advertisers. The advertiser web servers 30 host advertiser web pages 32. The system also includes several vendor web servers 34 that host vendor web pages 36. As will be discussed further below, the system can track user interaction with these servers and can allocate rewards in direct response to predetermined interactions.

Tracking User Behavior

In many embodiments, the client 12 provides the rewards management server 18 with information concerning the activities of the user. As will be discussed further below, several embodiments of the invention provide the user with the ability to control when and what information is communicated to the rewards management server 18. The information provided to the rewards management server can be used to track the user's behavior and/or provide the user with rewards. Various examples of activities that can be tracked and that can form the basis of rewards are discussed below.

In a number of embodiments, the rewards management server tracks and rewards a user's search related activities. A user can use the client 12 to provide a search query to a search engine server 16. The search engine server responds to the search request by generating a series of search results. The search results can be obtained using any search algorithms. In addition to the search results, the search terms can be used to identify advertisers interested in associating their advertisements with the search results. In many embodiments, the search results and advertisements are formatted as a web page that is provided to the client 12 by the search engine server 16. In the event that revenue is generated from advertising and/or via the user clicking through an advertiser's advertisement, the rewards management server 18 can allocate all or a portion of the revenue to an account maintained by the rewards management server 18 with respect to the user as a direct reward for the activity performed by the user. The reward can also be linked to the user performing an action with respect to an advertiser's site, such as viewing the site, joining the site, subscribing to a service, purchasing a good or service from the site, providing information to the site making a referral or recommendation, virally propagating an aspect of the site and/or any other action.

In several embodiments, the rewards management server 18 can track and reward a user's interactions with any site irrespective of whether the user was directed to the site as a result of a search query. In a number of embodiments, the rewards management server 18 tracks and rewards a user for interactions with sites associated with a content network. These interactions can include any of the interactions described above and can further include conducting a search within a content network, conducting a search from a site within a content network, and actions that may result in the user navigating away from the content network.

Types of Rewards

In addition or as an alternative to rewarding users with revenue, rewards management servers in accordance with several embodiments of the invention maintain information concerning the search history and/or browsing history of a user. The maintained information can be used by a rewards management server to allocate reward points to the user. The reward points can be exchanged for goods, services and/or money. Examples of appropriate points rewards include but are not limited to airline miles or points that can be exchanged for other rewards including airline miles or free stays at hotels or free mobile services including mobile telecommunications minutes, free passes to WiFi hotspots, free SMS messages, free MMS messages, and/or free ring tones, free games, free subscriptions to a mobile service or other services or a free device that permits the use of a service. The maintained information can also be used by a rewards management server to provide a user with offers for goods and/or services. In a number of embodiments, the search history and/or browsing history are also reviewed in the allocation of rewards to detect repeated patterns of high volumes of usage indicative of abuse of the system. In several embodiments, abuse is prevented by allocating awards in ways that cannot be predicted by a user so that repetitive behavior is not likely to result in the accumulation of rewards. Embodiments of various processes for tracking and rewarding different types of user behavior are described below.

Tracking and Rewarding Search Activity

Figure 2:
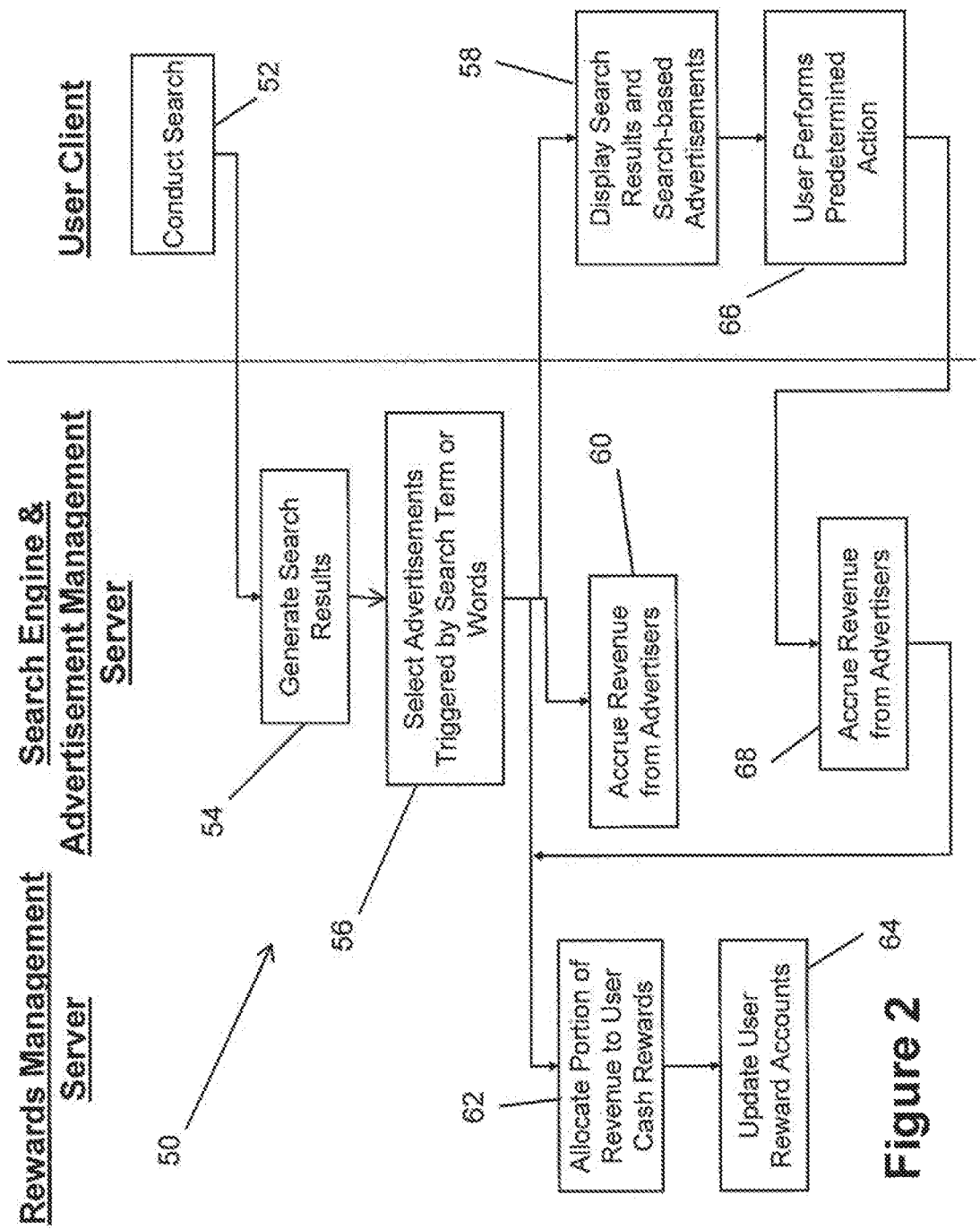
FIG. 2 is a flow chart of a process for rewarding a search engine user in accordance with an embodiment of the invention.

A process in accordance with an embodiment of the invention for tracking and/or rewarding a user's search activities is shown in FIG. 2. The process 50 includes conducting (52) a search in order to generate (54) search results. Once search results are generated, the search results can be used to select (56) advertisements relevant to the search terms or other information that formed the basis of the search. The search results and the selected advertisements can then be displayed (58). Often, the display of advertisements can result in a payment (60) from an advertiser. A portion of the payment can be allocated (62) to a user as a direct cash reward for the user's patronage of the search service. In the event that a cash reward is provided to the user, an account maintained on behalf of the user is updated (64) to reflect the reward. As discussed above, the payment is often predicated on the search not matching a pattern of activity determined to be indicative of abuse. In several embodiments, the reward is a predetermined amount that is unrelated to specific advertising revenue that is generated by a user's search. The amount can be determined, as an example, based upon average advertising revenue generation rates or using any other method.

Once the search results and advertisements are displayed, a user can perform any number of actions (66) including navigating to the web page of an advertiser. The act (often referred to as "click-through") of redirecting to an advertiser's website in response to an advertisement can result in the payment (68) of money to the search engine operator. In other embodiments, other predetermined actions such as clicking through a website and performing an action at the advertiser's website such as providing personal information, becoming a member of the site, completing a subscription, endorsing and/or recommending a person, entity, vendor, service provider or product, purchasing a product or service, virally propagating an aspect of the site and/or any other predetermined action or sequence of actions can result in the allocation of a reward. In a number of embodiments, a portion of the payment or a predetermined reward is allocated to a user. As with payments for the display of advertisements, the allocation (62) of a reward to the user is reflected by performing an update (64) to the user's account.

Tracking Specific Users

In order to track and/or assign rewards to a specific user, a rewards management server typically must be able to identify actions associated with specific users. In a number of embodiments, the user is identified to a rewards management server via software installed on the user's client device such as client software or a cookie. In other embodiments, the user identifies himself or herself to the rewards management server by logging into the rewards management server prior to performing any activity. A user can also instruct the rewards management server whether the user wishes for information to be collected and/or the type of information that the user is willing to allow the rewards management server to collect. A feature of many embodiments is that the user is uniquely identified and the information used to identify the user is maintained securely.

Figure 3:
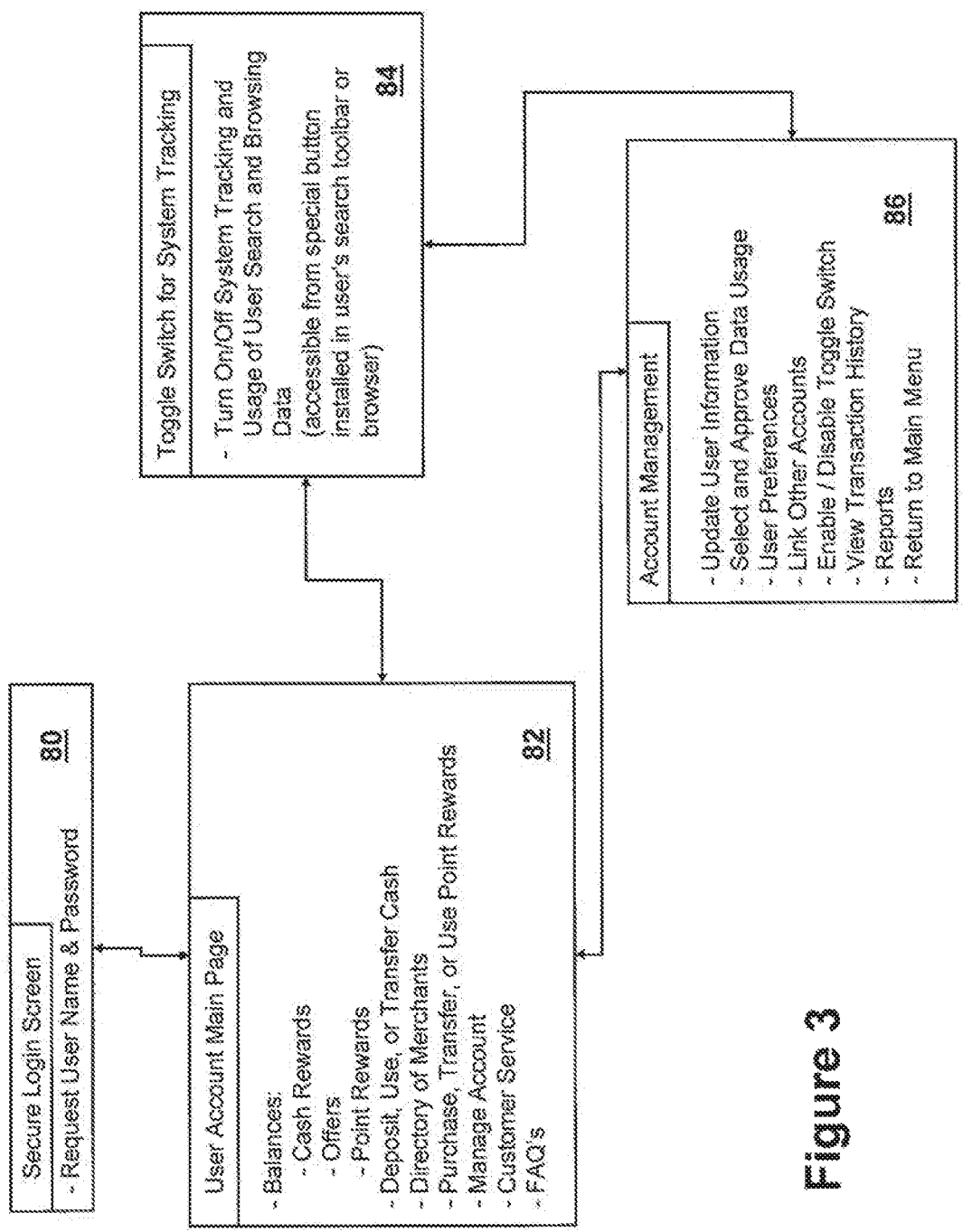
FIGS. 3-3c are state diagrams showing user interface screens related to the management of an account in a rewards system by a user in accordance with an embodiment of the invention.

A state diagram showing a series of user interface displays generated by a client in accordance with an embodiment of the invention is shown in FIG. 3. The state diagram includes a secure login screen 80 that includes prompts that request a user name and password from the user. The user name and password are used to populate a user account main page 82 with information about the user and his or her account. In several embodiments, the user account main page includes balances of various types of rewards such as cash rewards, offers and/or point rewards. In addition, the user account main page 82 can include prompts enabling the deposit, use or transfer of cash. The user account main page can also provide access to a directory of merchants with whom rewards can be redeemed. The user account main page can also provide prompts enabling the purchase of goods and/or services with reward points and the transfer of reward points. In many embodiments, the user account main page generally enables a user to manage his or her account and can provide the user with access to customer service and information to assist the user in the management of the account. In many embodiments, the user account main page supports messaging, contact management and/or online social networking features.

The user can transition from the user account main page to the toggle switch for system tracking page 84. The toggle switch for system tracking page 84 is a page that provides the user with prompts enabling the user to turn on and off system tracking and enabling the user to specify the type of information the system can collect and enabling the user to specify the collected information. In a number of embodiments, the toggle switch can be easily accessed from a dedicated button or from a pull-down menu in the user's browser or toolbar or search toolbar or a dedicated button on the user's browsing device as may be installed according to the user's preferences.

Information provided by a user in response to prompts on the user account main page 82 and the toggle switch for system tracking page 84 can lead to a transition to an account management page 86. The account management page 86 is a page that enables control over a variety of additional aspects of the user account. In a number of embodiments, the page can be used to update user information, select and approve data usage, specify user preferences, link to other accounts, enable or disable toggle switching, view the user's transaction history and/or generate reports. As an example, the user can link his or her account to a user's other accounts to facilitate the transfer of user information. These accounts can include, but are not limited to, accounts with other sites or vendors, content networks, financial institutions (e.g. PayPal, credit card, brokerage, etc.), other rewards programs and/or any other accounts containing personal information.

Figure 3B:
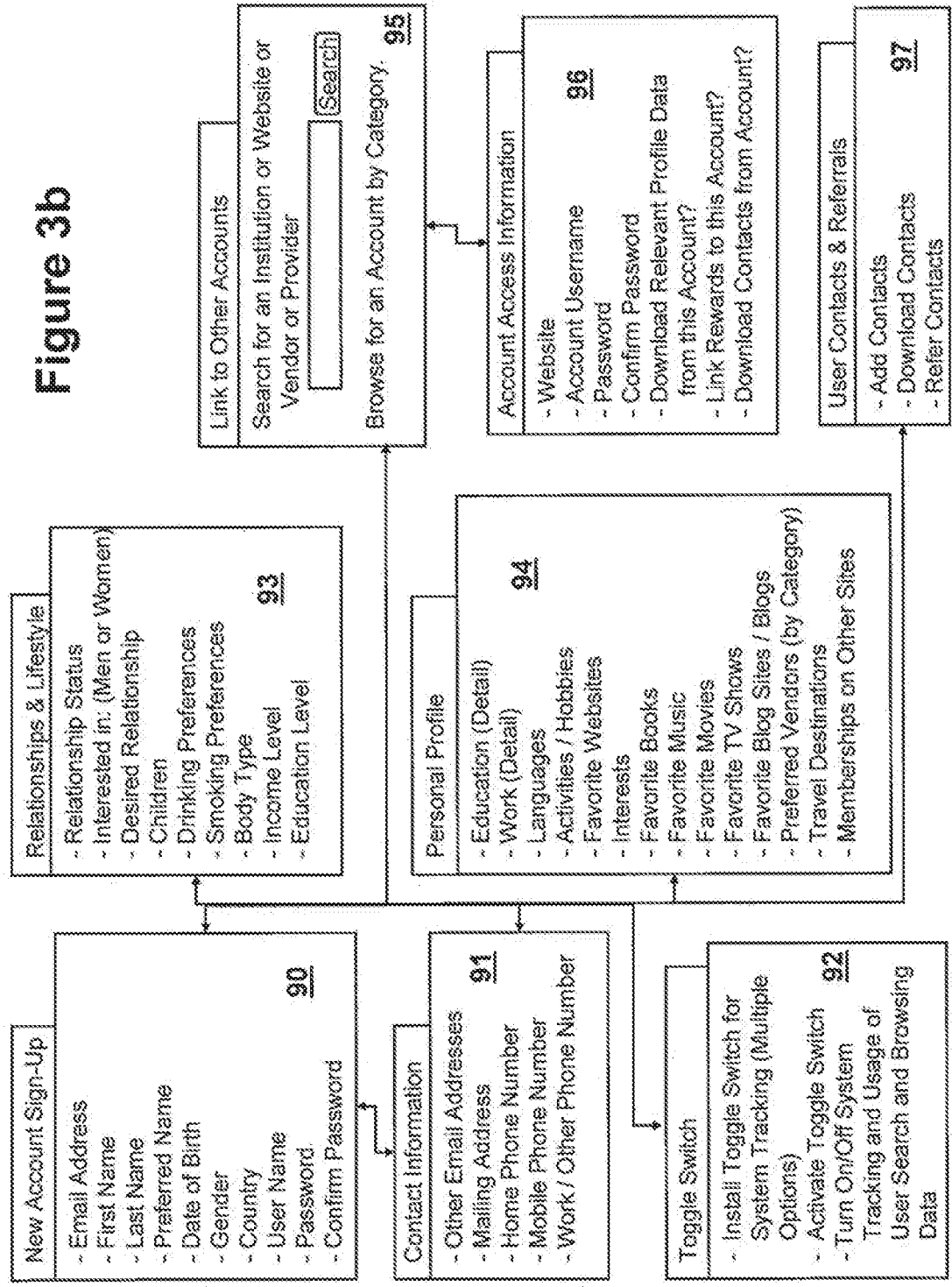

A state diagram showing a series of user interface diagrams generated by a client during creation of a user account in accordance with an embodiment of the invention is shown in FIG. 3*b*. When a user wishes to create an account, the user is provided with an initial sign-up screen 90 in which the user provides initial sign-up information that include an email address, first name, last name, date of birth, a user name and password. The initial information can be supplemented by other information that can be solicited from the user via additional sign up screens 91. The user can also modify the information at a later date. Once the user has created an account, the user can be provided with an interface 92 that facilitates the installation of tracking controls. The user is provided with one or more options for installing a toggle switch that enables the user to control whether or not tracking is enabled. The interface and/or other interfaces can also enable the user to specify the types of information that can be tracked and the uses that can be made of the tracked information. In systems that support profiles, the sign-up process can include additional interfaces that solicit additional information that can be used in refining offers, rewards and/or advertising presented to a user. In the illustrated embodiment, an interface 93 solicits profile information concerning relationships and lifestyle, and another interface 94 solicits personal information such as information concerning education, work history, hobbies, interests, favorite books, favorite music, favorite movies, favorite TV shows, favorite sites, travel destinations and membership on other sites. In many embodiments, profile information similar to that solicited in the interfaces 93 and 94 can be automatically obtained from other sites such as online networking sites. In several embodiments, the information is extracted using standard APIs. In the illustrated embodiment, an interface 95 provides a search facility that enables a user to search for sites (including sites of social networks, financial institutions, rewards programs, etc.) to link to the user's profile. The interface 95 also includes a directory to enable selection of sites to link to the user's profile. Another interface 96 can solicit information required to log into the site and extract information for inclusion in the user's profile. In embodiments that support messaging, an interface 97 can be provided that enables the user to import contact information into the user account. In many embodiments, the user is provided with rewards as an incentive for referring contacts to sign-up to be a part of the tracking and rewards system, and/or other programs. Although a specific set of interfaces and categories of information is shown in FIG. 3*b*, other interfaces can be used to construct a user profile.

As discussed above, interfaces can be provided that enable a user to specify the type of information that can be tracked by a tracking and rewards system in accordance with an embodiment of the invention. A state diagram showing a series of user interface displays for soliciting instructions from a user concerning the information to track is shown in FIG. 3*c*. One interface 98 includes a series of options of the types of information that can be tracked. In the illustrated embodiment, the categories include search data, browsing data, personal profile data, relationships and lifestyle data, and data from other linked accounts. In other embodiments, additional options and/or a different set of options can be provided. In many embodiments, options can be provided that enable a user to specify the usage of tracked information. In several embodiments, such options would include but not be limited to enabling a user to specify usage by data field within the user profile. Examples of uses can include whether the information can be provided to $3^{rd}$ parties, whether the information can be used to target advertising, offers and/or rewards, and/or whether the information can be used to refine search results. The state diagram in FIG. 3*c* also includes an interface 99 that enables the user to toggle tracking on and off. As discussed above, the tracking toggle can be provided in any of a variety of locations. The toggle can be located within the user interface of a browser, can be located within an interface provided by a web site and/or any other interface established by the operator of a tracking and rewards system.

Toggling Tracking

As discussed above, several embodiments of the system enable a user to toggle between tracking a user's activities and not tracking the user's activities. A flow chart showing a process for tracking system usage in response to an instruction to track system usage in accordance with an embodiment of the invention is shown in FIG. 4. The process 100 is similar to the process 50 shown in FIG. 2. However, in the process 100 shown in FIG. 4 a decision (102) is made concerning whether a user has enabled tracking of her or his browsing or searching. In the event that the user has not enabled tracking, the system either notifies (104) the user of the need to set tracking to obtain benefits or sets some form of a periodic reminder. When the user has enabled tracking, the generation (54') of search results and the performance of an action (56') of advertising causes the retrieval (106) of user data. The user's data is then updated with information concerning the search such as the time, location, browsing history, click-through information and any other available information that may be of interest. The information used to update the account can then be used to calculate (110) any cash rewards and/or point rewards to be credited to the user. In addition, the information can be used to select offers to provide to the user. The user's account can then be updated (112). The method 100 responds similarly to revenue obtained from the user completing a predetermined action (see discussion above). In many embodiments, the user only receives a benefit from completing a predetermined action (such as a portion of a payment from an advertiser) if the user has authorized the system to track the user's browsing and/or searching behavior. In many embodiments, the user is rewarded for selected searches across a time period (hour of day, or specific day or week or month or portion of year) and/or the system excludes any non-genuine searches from the calculation and/or allocation of any rewards so as to not invite abuse from users.

In several embodiments, non-genuine searches or non-genuine click-throughs on advertisements are ignored, receive reduced rewards and/or result in a deduction from the user's accrued rewards. In many embodiments, the Rewards Management System determines the level to which a search request is genuine by comparing a search request from the user and the related browsing pattern leading up to the search request and following the display of search results including but not limited to time spent on specific pages, click-throughs and/or links accessed, time of day, location, and other available data to the user's historical search and browsing patterns and/or to general statistics on current search topics and browsing patterns. In several embodiments, users are notified of an initial trial period during which no rewards are accrued or allocated; the purpose of such trial period is to store data on the user's use, search, and browsing patterns. This data is then used to guide the allocation of rewards once the trial period is concluded. In several embodiments, during periods where the user has enabled tracking, the Rewards Management System evaluates the search request and the related browsing pattern leading up to the search request and following the display of search results (as described above) and assigns a Search Authenticity Index for each search request. In a number of embodiments, a Search Authenticity Index is also assigned to a set of search requests. The Search Authenticity Index is used to analyze a sequence of search requests to determine whether to include the specific search requests in the calculation of rewards and/or the weighting to assign to such search requests for the purpose of calculating and/or allocating rewards at a time in the future. In many embodiments, the Rewards Management System randomly selects searches and/or click-throughs and/or browsing activities across a period of time to be included in the calculation and/or allocation of rewards so as to make it difficult for users to predict the way the system calculates and/or allocated rewards and to discourage users from conducting unnecessary or frivolous searches or attempting to abuse the system. In many embodiments, the system examines search requests from multiple users in real-time and/or click-throughs and/or browsing activities to determine whether such uses are intended for abuse so as to exclude such uses from the calculation and/or the allocation of rewards. In several embodiments, the system examines the number of search requests in real-time for a specific term or set of terms from a single user and from multiple users and/or the associated click-throughs to assign a probability of intent of abuse for such searches and/or click-throughs. Once the probability assigned crosses a pre-determined threshold, the system would reduce the weighting assigned to such search requests and/or click-throughs or exclude such search requests and/or click-throughs for the purpose of the calculation and/or allocation of rewards. The manner in which the probability is calculated varies as new patterns characteristic of abuse are identified. In many embodiments, the probability of intent of abuse is determined by calculating the correlation between a particular user's behavior and one or more predetermined patterns of abuse.

Tracking and Rewarding Activity Within a Content Network

In many embodiments, users can access pages that form part of a content network. Content networks are discussed above and can include a variety of online sites, such as publishers' sites, social utility websites, social networking websites, news pages or websites, or media broadcasters, or financial information websites, or news aggregators, or blog sites, or telecom utility websites or others. An embodiment of a process for rewarding a user for performing a search and browsing to pages within a content network is shown in FIG. 5. The process 120 is similar to the process 110 shown in FIG. 4. When a user browses to a page within a specified content network, the process determines 114' whether the user has enabled the process to track the user's browsing behavior. If the user has enabled tracking, then the system updates the user data and uses the data to reward the user for conducting searches and/or predetermined actions related to the content network (see description above for examples of typical predetermined actions). In the event the user has disabled tracking, then the system can remind (104') the user that the user could obtain rewards by enabling the tracking feature.

The process shown in FIG. 5 commences with a user conducting a search and then navigating to a site listed in the search results or a site associated with an advertisement accompanying the search results. Tracking and rewards systems in accordance with embodiments of the invention can continuously track a user's browsing behavior and reward the user for predetermined actions performed with respect to sites within a content network and/or sites outside of a content network. A distinction between sites within a content network and sites outside of a content network does not need to be made, but is often made where the tracking and rewards system derives revenue from the content network (for example serving advertising to sites within the content network).

An embodiment of a process for tracking and rewarding a user as the user interacts with sites within a content network is shown in FIG. 5b. The process 130 is similar to the process 120 shown in FIG. 5 with the exception that performing a search is simply one type of interaction that a user can have with the content network. As the user browses (131) the content network, advertising can be selected (132) and served (134) to pages within the content network by the tracking and rewards system. Assuming that tracking has been enabled, the system can provide rewards to the user related to viewing the advertisements. As the user interacts (122') with sites in the content network, the user's interactions can be tracked and used to award the user with rewards for performing specific predetermined actions within the content network (see discussion above for examples of typical predetermined actions that are rewarded). The advertisements displayed to the user can be site-targeted advertisements that are selected based upon the content on a particular site. When a search query is received, the advertising can be keyword-based advertising. The advertisements can also be context-targeted advertisements that are selected based upon the content of sites recently visited by the user and tracked by the system. The advertisements may also be advertisements selected based upon a user's historical browsing activity and/or based upon interests and/or other pieces of information specified within a user's profile. In several embodiments, the advertisements are selected by the tracking and rewards system and provided to the content network. In other embodiments, third parties select the advertisements based upon information provided by the tracking and rewards system and provide the advertisements to the content network. In further embodiments, third parties select the advertisements displayed within the content network without any communication with the tracking and rewards system.

Tracking General Browsing Activity

As discussed above, many embodiments of systems in accordance with the present invention collect information concerning the searching and browsing activities performed by a user. In several embodiments, rewards are provided for browsing within a content network. However, rewards are often awarded for simply enabling the tracking of browsing activity. A process for performing a search and rewarding a user in the event the user selects to browse to a web page that does not fall within a predetermined content network in accordance with an embodiment of the invention is shown in FIG. 6. The process 140 is similar to the process 100 shown in FIG. 5. The process 140 shown in FIG. 6 involves the user browsing outside a predetermined content network. The decision to browse outside the network does not involve the payment of money to the search engine provider, however, the process does check (114') to see whether the user has authorized tracking. If the user has authorized tracking, then the process adds information concerning the browsing activity to the user's account and potentially provides the user with a reward as an incentive for allowing tracking of the user's browsing behavior. In many embodiments, the information collected is used (often in combination with other information) to select the awards that are allocated to the user. In the event that tracking is not enabled, then the system can remind (104') the user that benefits can be derived by enabling tracking.

Tracking and rewards systems can generally track user browsing behavior (i.e., browsing between sites that may or may not form part of a content network). A process for tracking and rewarding general browsing behavior is shown in FIG. 6b. The process is similar to the process shown in FIG. 5b, with the exception that the process typically does not involve the selection of the advertisements that are displayed to the user. The process 150 simply involves tracking as the user visits sites (151) and interacts (152) with the sites. In a number of embodiments, the user's client application includes the ability to display advertising separate from the content provided by sites visited by the user. Revenue derived from advertising can be used in the allocation of rewards to the user. The advertising displayed can be selected based upon the content viewed in the browser, the browsing context, the user's browsing history and/or any other basis.

Although specific processes are outlined above for tracking the activities of a user and for allocating rewards, other processes in accordance with embodiments of the invention can be used to record interactions that a user has with sites and/or allocate rewards that may or may not be directly related to revenue derived as a result of the user's activities.

Rewards Management Servers

Much of the discussion above involves the utilization of the capabilities of a rewards management server. A rewards management server 18' connected to a pair of storage devices 24' and 24" is shown in FIG. 7. The rewards management server 18' hosts a rewards management system. The rewards management server 18' tracks user behavior and allocates rewards according to the behavior and the user's preferences. The rewards management server 18' can receive a variety of information as inputs. In one embodiment, the rewards management server 18' receives as inputs information including a user's current search request, a user's real time click-throughs, a user's real-time browsing, real time cost per impression or cost per thousand impressions (cost-per-mille) (CPM) information for site-targeted advertising, real time cost per click-through or cost-per-click (CPC) information and/or cost-per-action (CPA) information for keyword targeted advertising and/or context-targeted advertising, real time cost per impression or cost per thousand impressions (cost-per-mille) (CPM) information for keyword targeted advertising, offers from advertisers and/or vendors and real time exchange parameters for point vs. cash vs. offer rewards. In response to various inputs, a rewards management server 18' can generate an output that provides optimized rewards and offers for the user.

In order for the rewards management system to process the inputs and allocate rewards the rewards management system stores a variety of information on one or more storage devices. In the illustrated embodiment, the rewards management server 18' is connected to two storage devices. A first storage device 24' is used by the rewards management system to store information concerning user preferences. In many embodiments, the stored information includes whether tracking is enabled, selected and approved data usage, user reward accounts linked for disbursement of rewards, other user accounts or completed profiles linked to facilitate information transfer and access as authorized by the user, address information and demographic information.

A second storage device 24" is used by the rewards management system to store tracking data. In a number of embodiments, the stored tracking data includes historical searches, historical click-throughs, age (specified or inferred), location history, browsing history, income level (specified or inferred), education level (specified or inferred), career or profession (specified or inferred), employer and employment history, schools or universities attended, historical transactions/buying habits, group memberships, relationship information and preferences (specified or inferred), hobbies, subscriptions, preferred vendors, favorite movies, favorite books, languages, residence address and/or travel destinations and other information. In several embodiments, when the user does not specify user data or information, the system assigns a specific probability distribution on the inferred information and updates such probability distribution as new data becomes available from user's browsing or search activity or user specified information. In other embodiments, any tracked data and/or profile data considered useful by the operator or the rewards management server can be stored in any of a variety configurations.

Using Tracked Data to Refine Search Results

In addition to allocating rewards, historical information collected concerning a user's search and browsing history can be used to refine search results provided to the user by the search engine. A process for refining search results using historical information in accordance with an embodiment of the invention is shown in FIG. 8. The process 160 includes conducting (162) a search, which results in the generation (164) of a set of initial search results. A determination (166) can then be made as to whether the user has enabled tracking. If the user has not enabled tracking, then a reminder message can be provided (168) a periodic reminder set or a reminder counter incremented. When tracking is enabled, user data is retrieved (170) and information concerning the current search is added (172) to the user data. The historical information can then be used to refine (174) the search results. Once the results are refined, relevant advertisements can be selected (176) and displayed (178) with the search results to the user. The display of advertisements can result in the accrual (180) of revenue from advertisers. A determination (182) can then be made as to whether the user has enabled tracking (many systems rely on the first determination). If the user has disabled tracking, then the user can be provided (184) with a reminder. When tracking is enabled, various rewards associated with the user's activities can be calculated (186) and used to update (188) the user's account.

The manner in which a stored user profile, search history and/or browsing history can be used to refine search results can be illustrated by example. In many embodiments, the search engine categorizes search results by categories in addition to the search terms. The correlation between the categories and subjects that are likely to be of interest to the user and/or which have historically been of interest to the user is then determined and those categories with the highest correlation are presented to the user with an increased ranking. A number of examples are presented below.

If a user submits a search request using the terms "site monitoring", the system would generate the initial search results and check if the user has enabled tracking of searches and uses by the user, the system accesses the stored user information including browsing history, historical searches and click-throughs, current location, time, career or profession, historical transactions, and other stored data to provide more context for the search request and refine the search results. If for instance, the profession of the user (specified or inferred) is in the construction industry or a related industry and/or recent historical searches include the terms "construction site" or "construction" more relevance weighting is assigned to search results related to [construction] "site monitoring". In this example, if however, the profession of the user (specified or inferred) is in the information technology industry or in related industries and/or recent historical searches included "web security" or "web monitoring", then more relevance weighting is assigned to search results related to [web] "site monitoring". The system then refines the search results accordingly and selects advertisements to be displayed based upon triggered the refined search results.

In several embodiments, the system would aggregate search results under the key relevant headings in decreasing level of relevance starting with the most relevant heading; in the example used above, based on the resulting refinements, if search results related to [construction] "site monitoring" have the highest relevance, the heading "site monitoring" [construction] appears first with a few initial sub-headings (the remaining sub-headings can be further displayed if the user clicks on the heading) followed by the next relevant heading "site monitoring" [web] and its related sub-headings and so on and so forth. The word(s) in brackets provide the context for generated search results under a specific heading.

Another example is a search request by a user using the terms "development plan"; the system would generate the initial search results and check if the user has enabled tracking of searches and uses by the user, the system accesses the stored user information including browsing history, historical searches and click-throughs, career or profession, historical transactions, and other stored data to provide more context for the search request and refine the search results. If for instance, recent historical searches included "development coaching" or "professional development" or "personal development", then the system would assign more relevance weighting to [professional] "development plan" or [personal] "development plan" accordingly. If however, the stored data indicate that the profession of the user (specified or inferred) is in government or is related to economic development and/or recent historical searches include "economic plan" or "economic development" or "incentives", then the system would give more relevance weighting to search results related to [economic] "development plan". If on the other hand, the stored data indicate that the profession of the user (specified or inferred) is in the healthcare industry or in the pharmaceuticals industry or related fields and/or recent searches include "clinical trials" or "efficacy" or "clinical safety", then the system would give more relevance weighting to search results related to [clinical] "development plan". The system then refines the search results accordingly and selects the advertisements triggered by the refined search results to be displayed.

Similarly, the system would make use of stored data including historical searches, time of day, historical locations of the user, current location (as available), and other stored information to refine the search results for search requests using the terms "traffic report" and assigning relevance to various contextual categories of search results related to "traffic report" including [internet] "traffic report", or [current location] "traffic report", or [website] "traffic report" etc.

If the user has disabled tracking or if the stored data does not provide any helpful information to assign relevance weighting to specific search results for refining the initial search results, then the system would display the initial search results together with the selected advertisements triggered by the initial search results.

Figure 9:
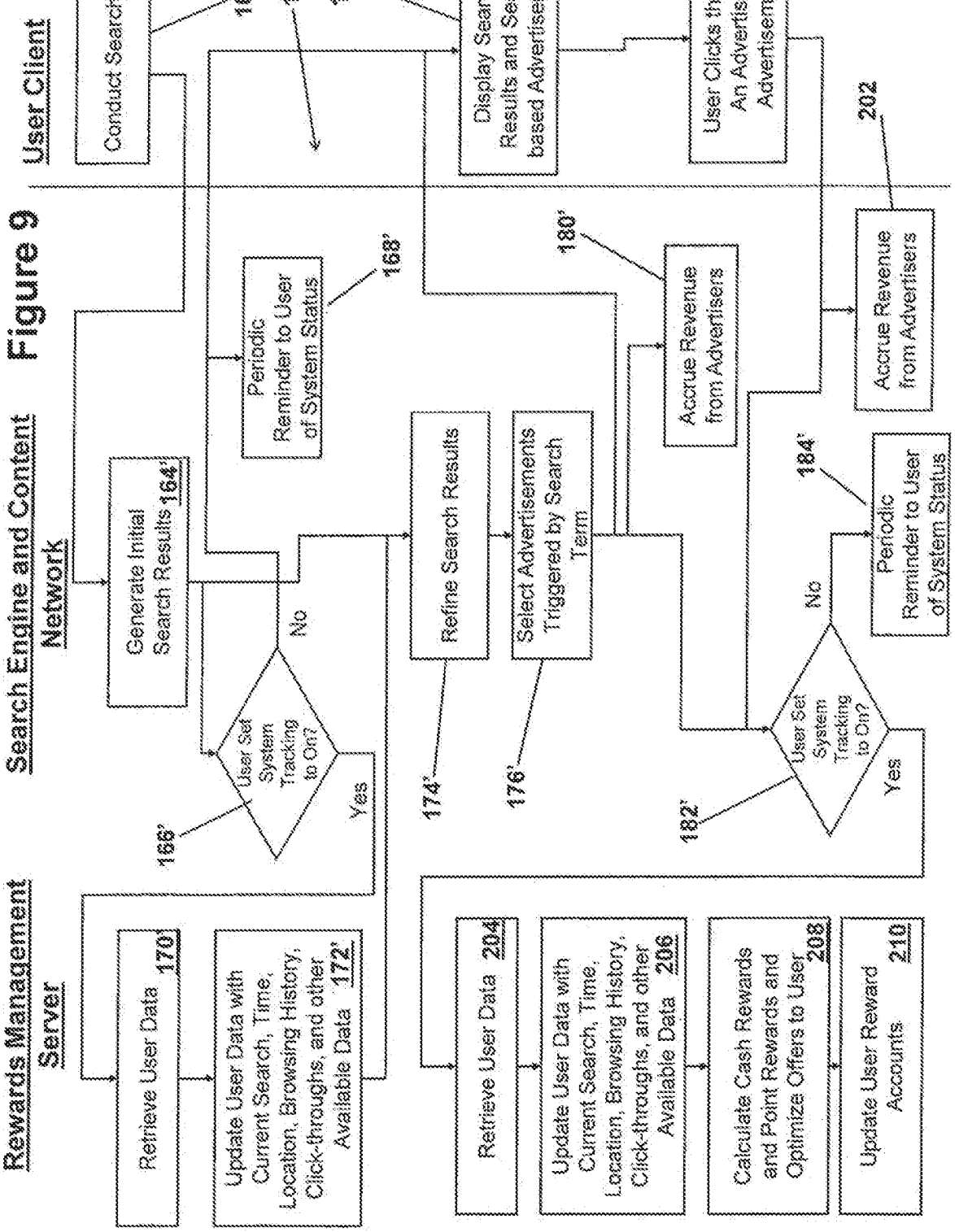
FIG. 9 is a flow chart showing a process for refining search results using historical information collected about a user and allocating rewards to the user in response to the user clicking-through an advertisement in accordance with an embodiment of the invention.

A process similar to the process shown in FIG. 8 for refining search results in response to previous search and browsing activity of a user in accordance with an embodiment of the invention is shown in FIG. 9. The process shown in FIG. 9 includes rewarding a user for clicking through advertising. The process 160' is similar to the process 160 shown in FIG. 8. When search results and advertisements are displayed to a user, the user can select (200) an advertisement. The selection can result in the accrual (202) of advertising revenue. The system then determines (182') whether tracking has been disabled. If the tracking has been disabled, then the user can be provided (184') with a reminder to enable tracking to obtain rewards. When tracking is enabled, the user's data is retrieved (204) and updated (206) to reflect the search results and/or browsing activity. The information concerning the search and browsing activity can then be used to calculate (208) rewards and the user's data is updated (210) to reflect any additional rewards.

Figure 10:
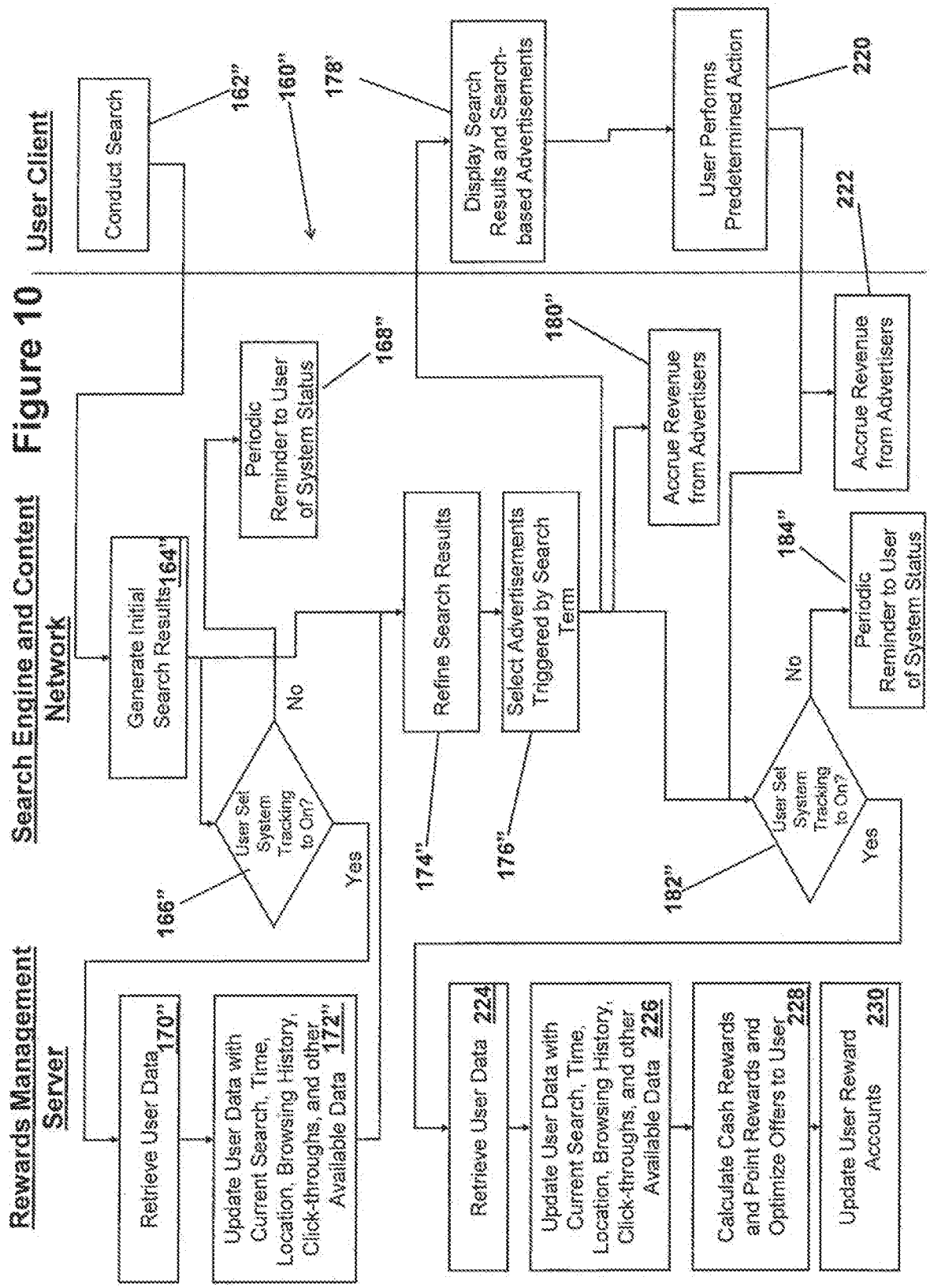
FIG. 10 is a flow chart showing a process for refining search results using historical information collected about a user and allocating rewards to the user in response to the user browsing to a website within a content network in accordance with an embodiment of the invention.

A process similar to the process shown in FIG. 9 for refining search results in response to previous search and browsing activity of a user and allocating rewards to the user in response to the user browsing to a page within a content network in accordance with an embodiment of the invention is shown in FIG. 10. The process shown in FIG. 10 includes rewarding a user for browsing to a page within a content network. The process 160" is similar to the process 160' shown in FIG. 9. When search results and advertisements are displayed to a user, the user can perform any of a predetermined set of actions (220) with respect to a site within a content network (see discussion above). The action can result in the accrual (222) of revenue from advertisers and/or other sources. The system then determines (182″) whether tracking has been disabled. If the tracking has been disabled, then the user can be provided (184″) with a reminder to enable tracking to obtain rewards. When tracking is enabled, the user's data is retrieved (224) and updated (226) to reflect the search results and/or browsing activity and/or current location, time of day, and other available data. The information concerning the search and browsing activity in addition to the stored data can then be used to calculate (228) rewards and the user's data is updated (230) to reflect any additional rewards.

Tracking and Rewards Systems for Mobile Phone Service Providers

A specific example of an application for tracking and rewards systems in accordance with embodiments of the invention is the use of tracking and rewards systems by mobile phone service providers. As discussed above, a client can be a mobile device. The tracking and reward system can be used to track usage of the mobile device for voice, data, or other communications and to reward users with various rewards as described above. The tracking and reward system can be used to track sites visited by subscribers to a mobile service and to reward users with benefits such as free minutes, free SMS messages, free MMS messages, handset upgrades and/or benefits unrelated to the provision of mobile phone services such as frequent flier miles or other types of rewards. In addition to tracking sites visited by a mobile device, tracking and rewards systems in accordance with embodiments of the invention can be used to track other types of transactions. Uses of tracking and rewards systems in mobile networks in accordance with embodiments of the invention are discussed further below.

Figure 11:
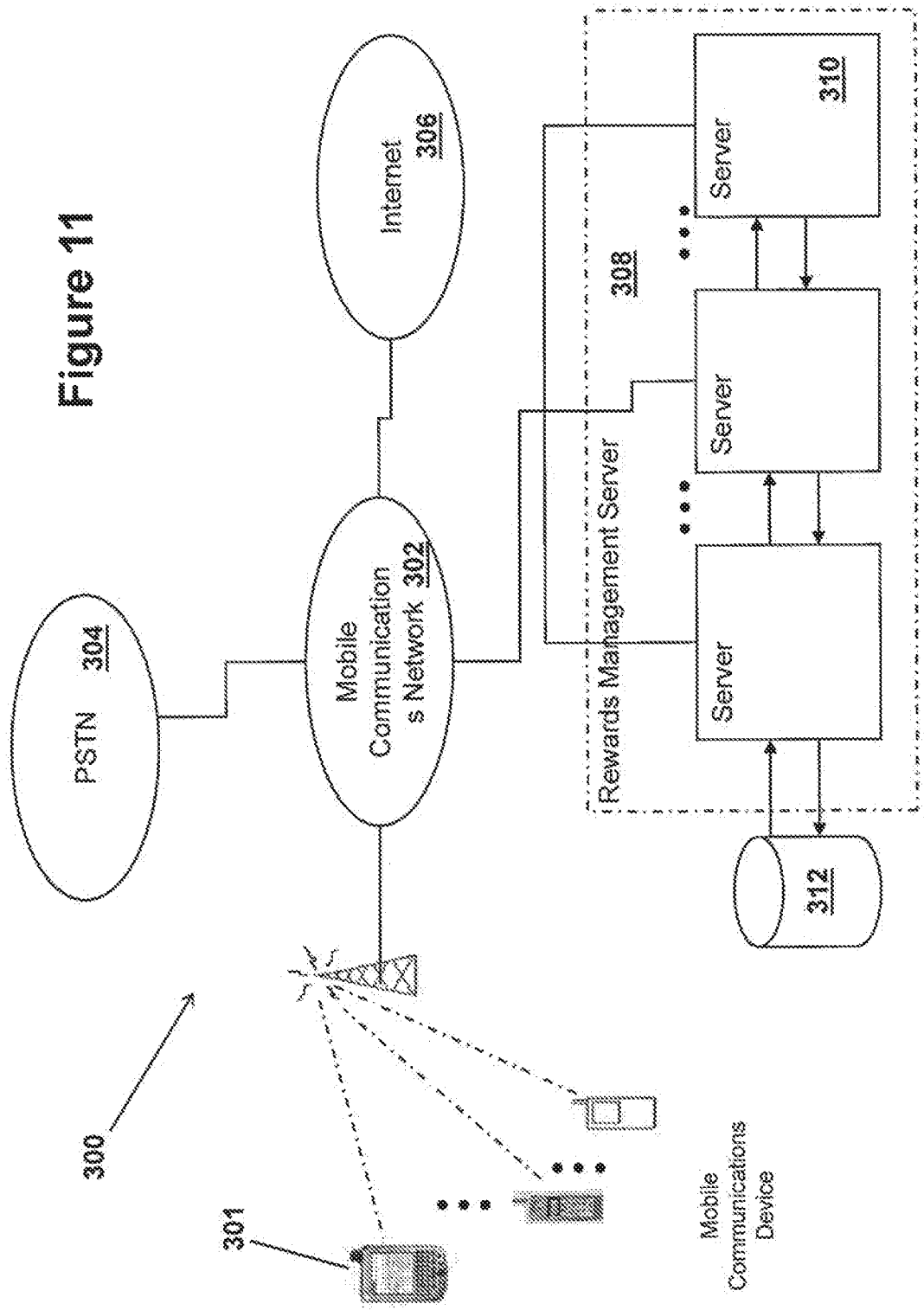
FIG. 11 is a schematic diagram of a tracking and rewards system integrated with a mobile communications network in accordance with an embodiment of the invention.

A mobile network that includes a rewards management server in accordance with an embodiment of the invention is shown in FIG. 11. The system 300 includes a plurality of mobile devices 301 that can connect to one or more mobile communications networks 302. The mobile communications networks can provide gateways to other networks. In the illustrated embodiment, the mobile communications network 302 provides gateways to the public switched telephone network (PSTN) 304 and to the Internet 306. Mobile devices can conduct voice calls via the mobile communications network and the PSTN. Mobile devices can exchange data with sites via the mobile communications network and the Internet.

The mobile communications network 302 is also connected to a rewards management server 308. In the illustrated embodiment, the rewards management server includes a plurality of servers 310 that are connected to a database 312. The rewards management server can be integrated into a mobile telephone service provider's billing system or be separate from the billing system. The rewards management server 308 can be used in a manner, similar to that outlined above, to track a user's search activities, sites visited by the user and actions performed by the user. In addition to tracking, the system can allocate rewards based upon tracked user behavior. In a number of embodiments, the user creates a user profile or is granted a user profile by the mobile phone service provider and the user can populate the profile with information (see discussion above). In several embodiments, the user can control when and the type of information that is tracked. In a number of embodiments, the user is able to communicate with the rewards management server 308 via the user's mobile device 301. In many embodiments, the user is able to communicate with the rewards management server 308 via a site accessible by any device capable of connecting to the Internet. A similar process can be used to track and reward a user browsing between websites that do not form part of a content network.

Figure 12:
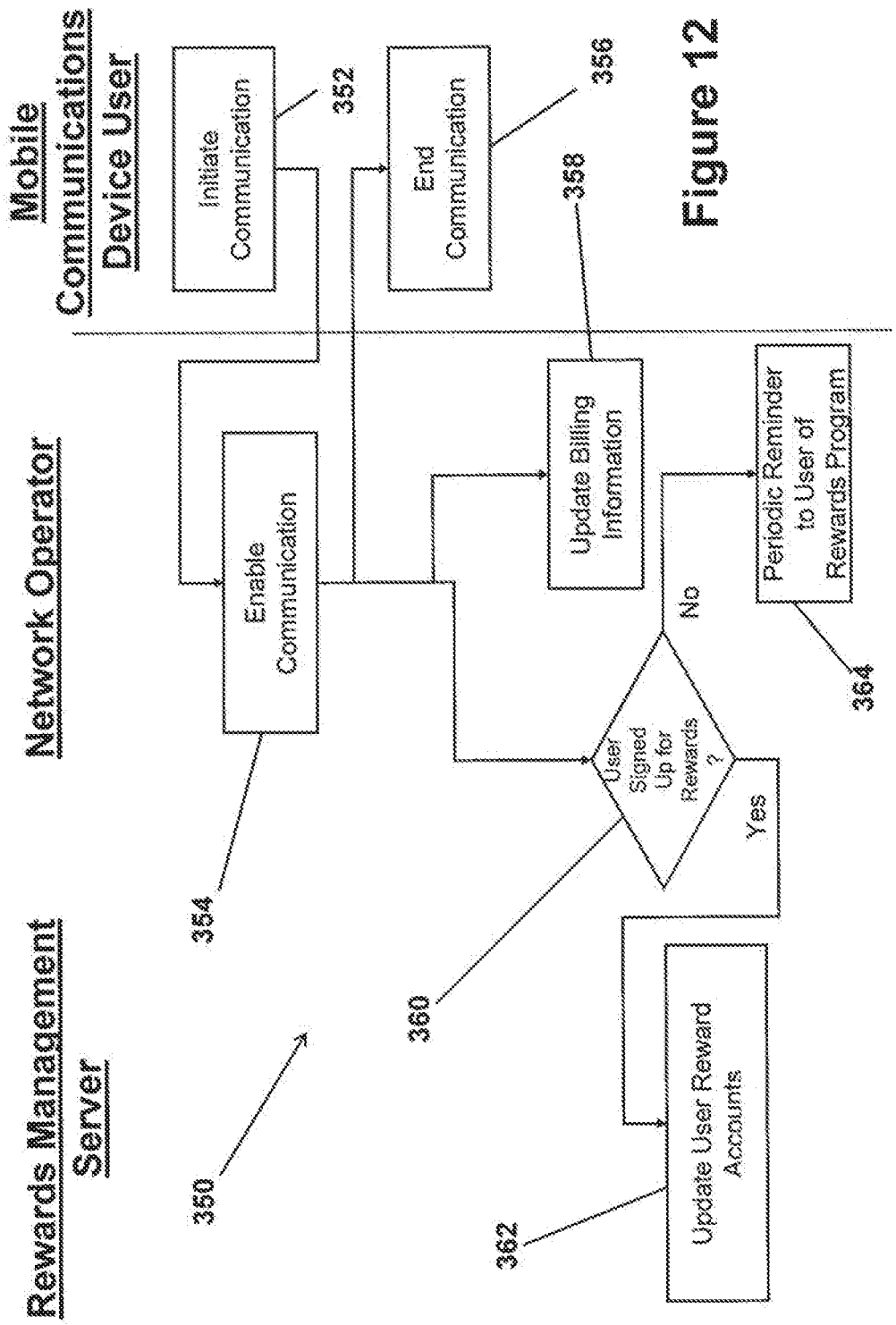
FIG. 12 is a flow chart showing a process for tracking and rewarding a user that communicates using a mobile device in accordance with an embodiment of the invention.

A process for tracking activities performed using a mobile telephone in accordance with an embodiment of the invention is shown in FIG. 12. The process 350 includes initiating (352) a communication. The communication is enabled (354) and the communication is completed (356). The communication can be any type of communication. For example, a telephone call, an SMS text message, an MMS message, an email, and/or a data transfer. A user billing account associated with the mobile phone is updated (358) and/or decision (360) is made as to whether the user has signed up for the rewards program. If the user has signed up and/or the user has activated tracking, then the user's reward account is updated (362). If the user has not created an account and/or has not activated tracking, then the user can be provided (364) with a periodic reminder to encourage the use of the rewards program.

Figure 13:
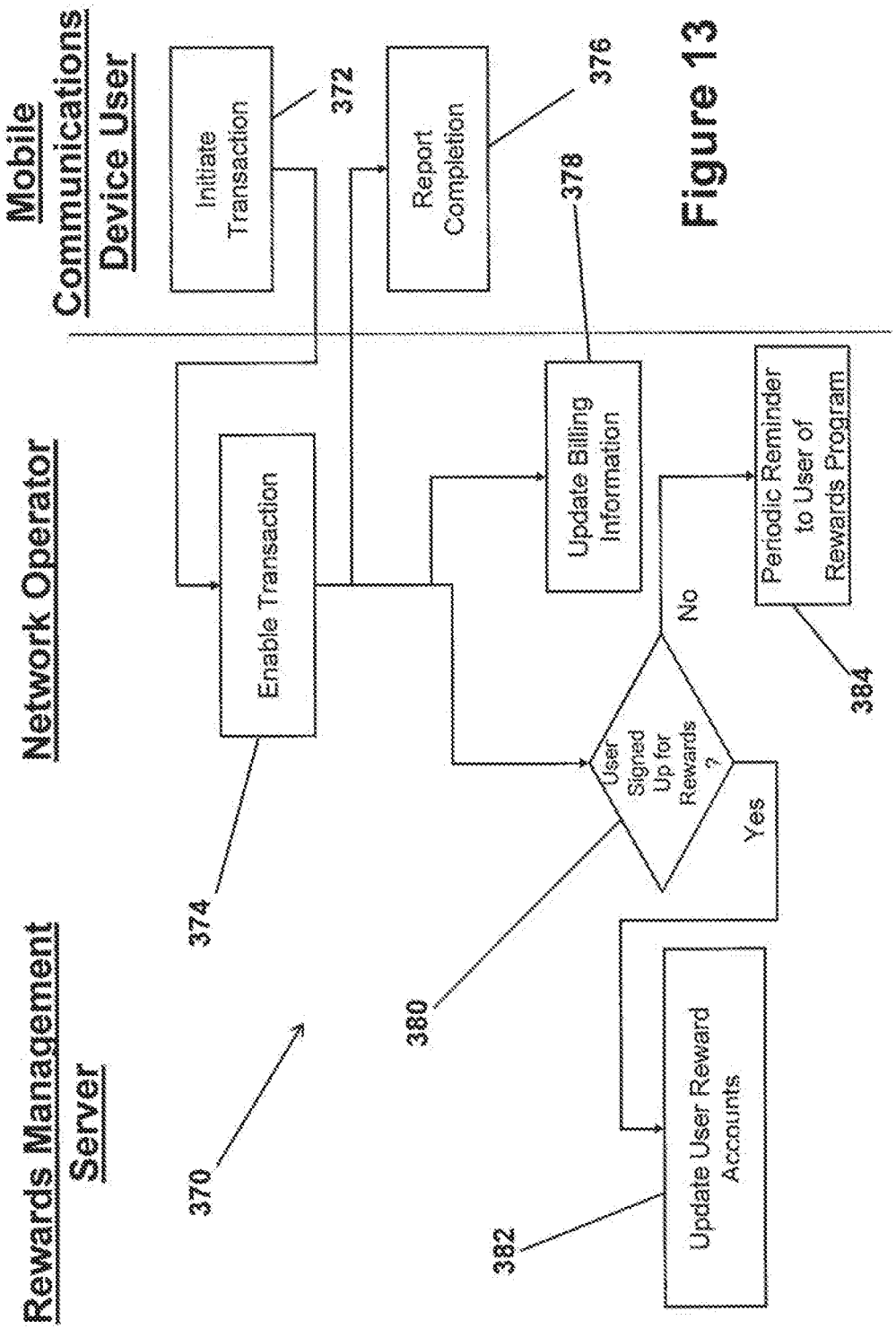
FIG. 13 is a flow chart showing a process for tracking and rewarding a user that conducts transactions using a mobile device in accordance with an embodiment of the invention.

In many embodiments, goods and services can be purchased using the mobile device and/or other types of transactions can be conducted using the mobile device (including purchases of goods or services, subscription to services, payment transactions, financial transactions, and transaction associated with rewards programs). A process for tracking the conduct of transactions and providing rewards in direct response to the completion of predetermined transactions in accordance with an embodiment of the invention is shown in FIG. 13. The process 370 includes initiating (372) a transaction using a mobile device, which is then enabled (374) by the network operator. Where the transaction involves a service provided by the network operator, enabling the transaction may simply involve activating the service. In embodiments where the transaction involves goods and/or services provided by a 3rd party, the network operator can facilitate the transaction. The completion of the transaction is reported (376) to the user and, to the extent the transaction involves payment of money, the user's billing account is updated (378) to reflect the cost of the transaction. In other embodiments, other accounts such as accounts maintained by financial institutions or institutions that provide other payment technologies are updated. A determination (380) is made as to whether the user has a rewards account and has authorized tracking with respect to a category that includes the transaction. When the user has authorized tracking of the transaction, the user's rewards account is updated (382) to reflect the transaction. When the user has not created an account and/or has not authorized the tracking of rewards, then the user can be periodically reminded (384) of the opportunity to create a rewards account.

While the above description contains many specific embodiments of the invention, these should not be construed as limitations on the scope of the invention, but rather as an example of one embodiment thereof. For example, the above discussion focuses on awarding rewards for searching and browsing content networks and/or various sites located throughout the Internet. Several embodiments of the invention encourage users to access a web site by providing users with rewards for browsing content and/or performing searches for content located within a specific site. Accordingly, the scope of the invention should be determined not by the embodiments illustrated, but by the appended claims and their equivalents.

What is claimed is:

1. A method of displaying targeted advertising to a user of a search engine comprising:
   receiving secure identification information using a rewards management server, where the secure identification information identifies a user account, and where the rewards management server comprises a processor and a memory readable by the processor;
   linking the user account to a $3^{rd}$ party account associated with the user stored on a $3^{rd}$ party server using the rewards management server;
   importing user profile data from the $3^{rd}$ party account to the user account, wherein the user profile data describes historical information about the user which describes previous browsing activities performed by the user;
   receiving a search query associated with the user account using at least one search engine server, where the search query comprises a set of search keywords utilized by the at least one search engine server to generate search results;
   selecting at least one advertisement based on the user profile data and the search query;
   returning the at least one advertisement and the search results in response to the received search query;
   receiving an instruction using the rewards management server to enable tracking of the user via an interface that enables the user to toggle tracking on and off during the user's browsing activity;
   tracking the activity of the user using the at least one rewards management server, the tracked activity comprising search queries and browsing history; and
   updating the user profile data using the at least one rewards management server based on information specified by the user and information inferred from the tracked user activity.

2. The method of claim 1, wherein the historical information describes previous search queries performed by the user.

3. The method of claim 1, wherein the historical information describes information selected from the group consisting of income level, age, location, education level, profession, employment, associated educational institutions, buying habits, group memberships, relationship status, relationship preferences, hobbies, subscriptions, preferred vendors, favorite movies, favorite books, languages, and preferred travel destinations.

4. The method of claim 1, further comprising rewarding the user for using the search engine.

5. The method of claim 4, wherein the reward is free access to the search engine.

6. The method of claim 4, wherein the reward is improved quality of services provided to the user.

7. The method of claim 1, wherein the inferred information is selected from the group consisting of income level, age, location, education level, profession, employment, associated educational institutions, buying habits, group memberships, relationship status, relationship preferences, hobbies, subscriptions, preferred vendors, favorite movies, favorite books, languages, and preferred travel destinations.

8. The method of claim 1, further comprising updating the profile data based on the search query.

9. The method of claim 1, wherein the $3^{rd}$ party account is a social network account.

10. The method of claim 1, wherein the instruction includes authorization from the user to track at least one type of information selected by the user from the search queries or the browsing history.

11. A search engine server system, comprising:
    a processor; and
    a memory configured to store an advertising application;
    wherein the advertising application directs the processor to:
      receive secure identification information identifying a user from a user client application identifying a user account using a rewards management server comprising a processor and a memory readable by the processor;
      link the user account to a $3^{rd}$ party account associated with the user stored on a $3^{rd}$ party server using the rewards management server;
      import user profile data from the $3^{rd}$ party account to the user account, wherein the user profile data describes historical information about the user comprising previous browsing activities performed by the user;
      receive a search query associated with the user account using at least one search engine server, where the search query comprises a set of search keywords utilized by the at least one search engine server to generate search results;
      select at least one advertisement based on the user profile data and the search query;
      return the at least one advertisement and the search results in response to the received search query;
      receive an instruction using the rewards management server to enable tracking of the user via an interface that enables the user to toggle tracking on and off during the user's browsing activity;
      track the activity of the user using the rewards management server, the tracked activity comprising search queries and browsing history; and
      update the user profile data using the rewards management server based on information specified by the user and information inferred from the tracked user activity.

12. The system of claim 11, wherein the historical information describes previous search queries performed by the user.

13. The system of claim 11, wherein the advertising application further directs the processor to reward the user for using the search engine.

14. The system of claim 13, wherein the reward is free access to the search engine.

15. The system of claim 11, wherein the inferred information is selected from the group consisting of income level, age, location, education level, profession, employment, associated educational institutions, buying habits, group memberships, relationship status, relationship preferences, hobbies, subscriptions, preferred vendors, favorite movies, favorite books, languages, and preferred travel destinations.

16. The system of claim 11, wherein the advertising application further directs the processor to update the profile data based on the search query.

17. The system of claim 11, wherein the $3^{rd}$ party account is a social network account.

18. The system of claim 11, wherein the instruction includes authorization from the user to track at least one type of information selected by the user from the search queries or the browsing history.

19. A method of displaying targeted advertising to a user of a content network, comprising:
    linking a user account associated with the content network to a $3^{rd}$ party rewards management server;

exporting user profile data from the content network to the 3$^{rd}$ party rewards management server, wherein the user profile data describes historical information about the user comprising previous browsing activities performed by the user;

receiving an advertisement selected by the 3$^{rd}$ party rewards management server associated with the user profile;

displaying the advertisement to the user;

receiving an instruction using the 3$^{rd}$ party rewards management server to enable tracking of the user via an interface that enables the user to toggle tracking on and off during the user's browsing activity;

tracking the activity of the user using the 3$^{rd}$ party rewards management server, the tracked activity comprising search queries and browsing history; and updating the user profile data using the at least one rewards management server based on information specified by the user and information inferred from the tracked user activity.

20. The method of claim 19, wherein the content network is a social network.

\* \* \* \* \*